United States Patent [19]
Abi-Ezzi et al.

[11] Patent Number: 5,377,320
[45] Date of Patent: Dec. 27, 1994

[54] METHOD AND APPARATUS FOR THE RENDERING OF TRIMMED NURB SURFACES

[75] Inventors: Salim S. Abi-Ezzi, Foster City; Srikanth Subramaniam, Menlo Park, both of Calif.

[73] Assignee: Sun Microsystems, Inc., Mountain View, Calif.

[21] Appl. No.: 953,971

[22] Filed: Sep. 30, 1992

[51] Int. Cl.$^5$ ................................................ G06F 3/14
[52] U.S. Cl. ..................................... 395/163; 395/119; 395/123; 395/127
[58] Field of Search ............... 395/119, 123, 134, 129, 395/132, 142, 121, 162–166, 125, 127; 345/20, 27, 147, 149, 186, 199, 203, 133

[56] References Cited

U.S. PATENT DOCUMENTS

| | | | |
|---|---|---|---|
| 4,912,659 | 3/1990 | Liang | 395/123 |
| 4,999,789 | 3/1991 | Fiasconano | 395/127 |
| 5,255,352 | 10/1993 | Folk | 395/125 |
| 5,276,783 | 1/1994 | Fossum | 395/119 |
| 5,278,948 | 1/1994 | Luken, Jr. | 395/163 |

OTHER PUBLICATIONS

Salim Abi–Ezzi and Michael Wozny: "Factoring a Homogeneous Transformation for a more Efficient Graphics Pipeline", *Proc. Eurographics '90*, Montreux, Switzerland, pp. 245–255, Sep. 1990.

Salim Abi–Ezzi and Leon Shirman: "Tessellation of Curved Surfaces under Highly Varying Transformations", *Proc. Eurographics '91*, Vienna, Austria, pp. 385–397, Sep. 1991.

R. Farouki and V. Rajan: "Algorithms for Polynomials in Bernstein form," *Computer Aided Geometric Design*, 5(1988), pp. 1–26, 1988.

Daniel Philip, Robert Magedson, and Robert Markot: "Surface Algorithms Using Bounds on Derivatives," *Computer Aided Geometric Design*, 3(1986), pp. 295–311, 1986.

Jeffrey Lane, Loren Carpenter, Turner Whitted, and James Blinn: "Scan Line methods for Displaying Parametrically Defined Surfaces," *Communications of the ACM*, 23(1), Jan. 1980.

List continued on next page.

*Primary Examiner*—Mark R. Powell
*Assistant Examiner*—Kee M. Tung
*Attorney, Agent, or Firm*—Blakely Sokoloff Taylor & Zafman

[57] ABSTRACT

A unique graphics pipeline and method for utilizing the same to render trimmed non-uniform rational b-spline (NURBS) surfaces is described. To render a graphics primitive such as a trimmed NURBS, the primitive first is processed through a compilation step, followed by a two phase traversal step and a display step. Through this process, the NURBS surface is reduced at creation time into a form amenable for fast processing subsequently during traversal. At compilation the trimmed NURBS is broken down into monotone v-regions which remain valid for subsequent views and renderings. The form produced by compilation is independent of the tessellation step size; therefore the form remains valid under heavy changes to modeling and/or viewing transformations. Furthermore, a substantial portion of the processing complexity for rendering the primitive is absorbed at compilation, thus minimizing the complexity of tessellation at traversal. Once the graphic primitive is processed through the compilation step, the primitive is processed through the two phase traversal step. The two phases may be processed in parallel.

26 Claims, 24 Drawing Sheets

OTHER PUBLICATIONS

Jeffrey Lane and Richard Riesenfeld: "A Theoretical Development for the Computer Generation and Display of Piecewise Polynomial Surfaces," *IEEE Transactions on Pattern Analysis and Machine Intelligence*, 2(1), pp. 35-46, Jan. 1980.

Sheue-Ling Lien, Michael Shantz, and Vaughan Pratt: "Adaptive Forward Differencing for Rendering Curves and Surfaces," *Computer Graphics*, 21(4), pp. 111-117, Jul. 1987.

Alyn Rockwood: "A Generalized Scanning Technique for Display of Parametrically Defined Surfaces," *IEEE Computer Graphics & Applications*, pp. 15-26, Aug. 1987.

Alyn Rockwood, Kurt Heaton, and Tom Davis: "Real-Time Rendering of Trimmed Surfaces," *Computer Graphics*, vol. 23, No. 3, pp. 107-116, Jul. 1989.

Alain Fournier and Delfin Y. Montuno, "Triangulating Simple Polygons and Equivalent Problems," *ACM Transactions of Graphics*, vol. 3, No. 2, pp. 153-174, Apr. 1984.

Michael R. Garey, David S. Johnson, Franco P. Preparata and Robert E. Tarjan, "Triangulating a Simple Polygon," *Information Processing Letters*, vol. 7, No. 4, Jun. 1978.

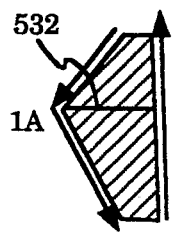
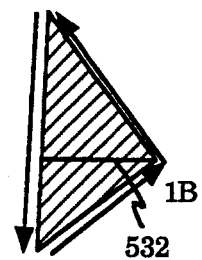
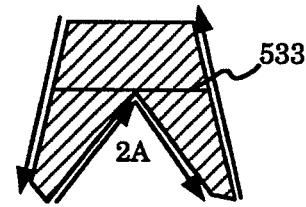
*Figure 6a*     *Figure 6b*     *Figure 6c*
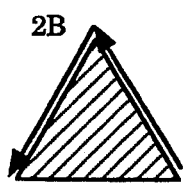
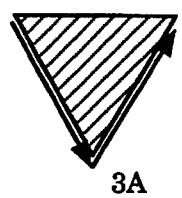
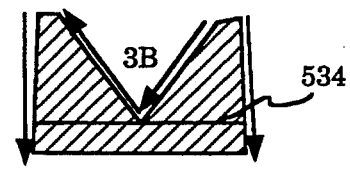
*Figure 6d*     *Figure 6e*     *Figure 6f*
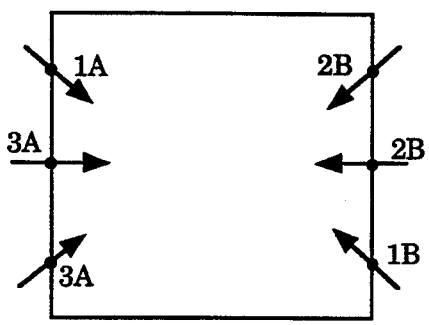
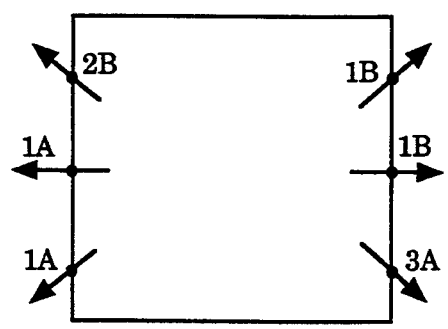
*Figure 6g*     *Figure 6h*

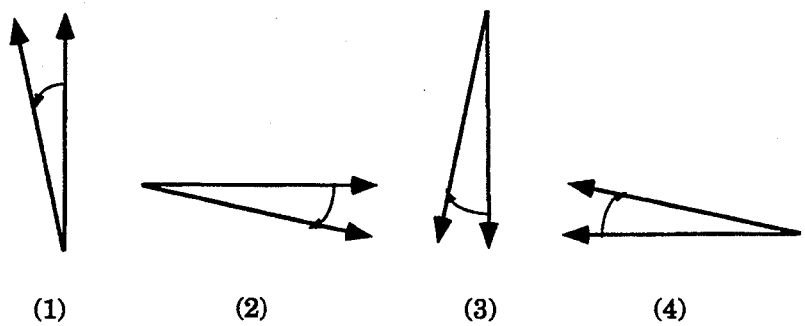
(1) (2) (3) (4)
*Figure 7a*
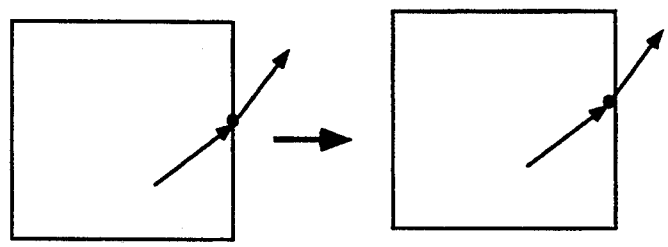
(1)
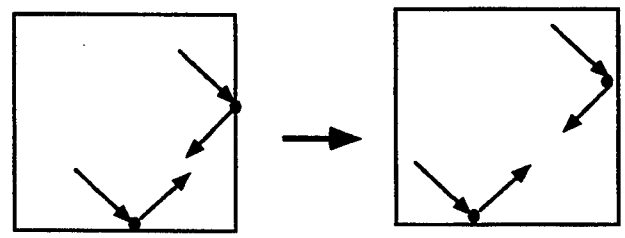
(2)
*Figure 7b*
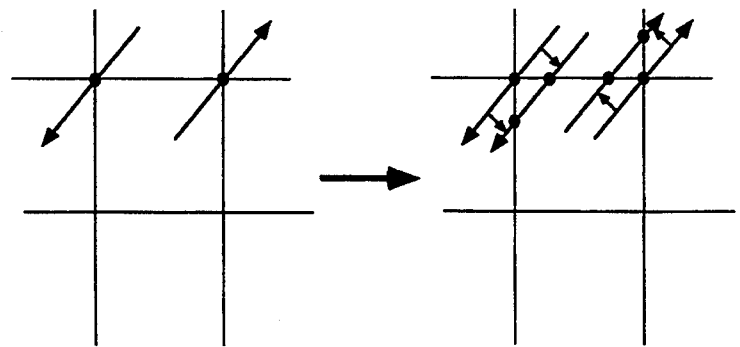
*Figure 7c*

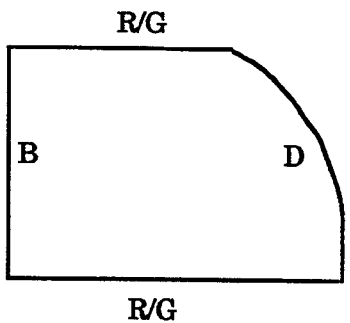
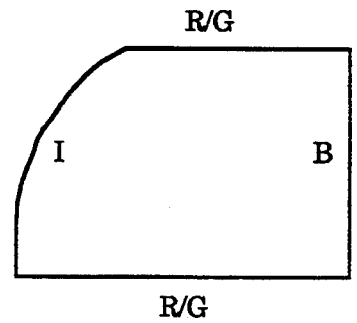
*Figure 8a*     *Figure 8b*
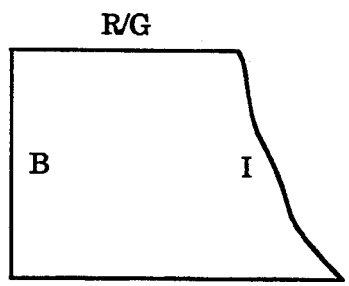
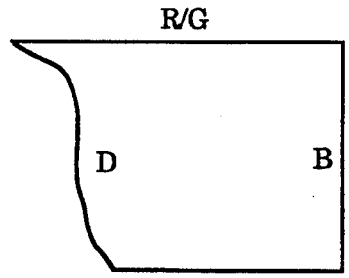
*Figure 8c*     *Figure 8d*

Input:
Two lists of points one external and one internal, (E,I), each list
has a corresponding indices to start and end points, and a step size,
($beg_e$, $end_e$, $s_e$, $beg_i$, $end_i$, $s_i$ ). by definition the external points are more
numerous than the internal points, $n_e > n_i$.

Output:
Triangles that connect between internal and external points, such that
the length of the longest triangle side in parameter space is minimized.
This routine uses the triangulation mechanism discussed in Section 6.2

Algorithm:

$i_i = beg_i$;/* index to first interior point */
    $i_e = beg_e$;/* index to first exterior point*/

$t_e = param_value(E[i_e])$;/* parameter value of first exterior point */
    $A = (s_i + s_e)/2$; /* average of step sizes */
    $L = i_i + s_i - A$;/* keeps track of the limit, beyond
                                   which an interior point is sent */

Init; /* start a general triangle strip */
    SendA($E[i_e$ + +]); /* start by sending first exterior point */
    SendB($I[i_i$ ++]); /* send first interior point */

For (; $i_e < end_e$; $i_e$ + + ) do {

SendA($E[i_e]$); /* send exterior points in order */ if($t_e > L$) { /*when the limit is crossed */
            if (i_i <= end_i)
                SendB(I[i₁ + +]); /* send an interior point */
            $L = L + s_i$;/* update the limit */

}
    $t_e$ + = $s_e$;/* keep track of parameter value
                                  of next interior point */
    } /* For loop */

Submit;

*Figure 18b*

INPUT:
* A REFERENCE TO ONE OF HTE FOUR SIDES OF THE PATCH: {LEFT, TOP, RIGHT, BOTTOM}.

* A STRICTLY INCREASING SEQUENCE OF N SCALARS SI AND A CORRESPONDING SEQUENCE OF LABELS $L_L$, WHERE A LABEL IS IN {A, B, C}.

OUTPUT:

A SEQUENCE OF TRIANGLES THAT STITCHES THE GAPS BETWEEN ADJACENT TRIMMED PATCHES.
THIS ROUTINE GENERATES THE CONTROL PART OF THE TRIANGULATION MECHANISM DISCUSSED IN SECTION 6.2.

ALGORITHM:

*GENERATE A SEQUENCE OF POINTS $P_T$ AT THE PARAMETER VALUES $S_I$ ON THE GIVEN SIDE OF THE PATCH.
*INIT

```
* FOR (i = 0; i < n; i++) DO {
   IF (Li == A) SEND A (Pi)
   ELSE IF (Li == B) SEND B(Pi)
       ELSE { /* Li = C */
             IF (i == n) {SEND A (Pi); SUBMIT; BREAK }
             IF (Li+1 = C) {SEND A (Pi)
SUBMIT; INIT;

REPEAT
                 IF (++i = n - 1) BREAK;

UNTIL (Li+1 ≠ C);
       }

IF (Li = A) {SEND B(Pi); SUBMIT; INIT;
SEND B (Pi) }
        ELSE {SEND A(Pi)
SUBMIT; INIT;
SEND A((Pi)
  } /* FOR LOOP */
```

*Figure 19c*

METHOD AND APPARATUS FOR THE RENDERING OF TRIMMED NURB SURFACES

BACKGROUND OF THE INVENTION

1. Field of the Invention

The present invention relates to a method and apparatus for quickly and efficiently rendering graphic images on a computer graphics display device. More particularly, the present invention relates to a method and apparatus for rendering trimmed NURBS primitives on a computer graphics display device.

2. Art Background

In the past, computer graphic systems required extensive display and computer resources. The amount of computation time required to render images was substantial. Images of any complexity required powerful computers to process hours in order to generate the image. Today, technology has greatly improved. The rendering of three dimensional ("3D") objects is no longer a process reserved for high-powered mainframe computers. The rendering of complex graphic objects is now realized on smaller, less powerful computers.

Furthermore, graphics processes have become more sophisticated. In particular the utilization of sophisticated graphic primitives are now prevalent. However the utility of the sophisticated graphic primitives are measured in part by the speed a computer system can render the primitive on a display device. An example of such a primitive is a trimmed NURBS. A trimmed NURBS is a non-uniform rational B-spline surface with trimming loops which define the relevant portions of the surface.

The generation of the graphic image represented by a trimmed NURBS is quite complex and time consuming, outweighing many of the benefits gained by using the trimmed NURBS primitive to define a graphic object. The rendering problem is compounded considering the dynamic and interactive nature of computer graphics today.

Techniques have been developed to render curved surface, such as NURBS, directly from the curved surface primitives which define the surface. See, for example, Jeffrey Lane, Loren Carpenter, Turner Whitted, James Blinn, "Scan Line Methods For Displaying Parametrically Defined Surfaces", Communications of the ACM, 23(1), January, 1980; and Sheue-Ling Lien, Michael Shantz and Vaughan Pratt, "Adaptive Forward Differencing For Rendering Curves and Surfaces", Computer Graphics, 21(4), pp. 111-117July, 1987. However these techniques are not general in application and apply to a very restricted class of NURBS. Furthermore, trimming is also not handled in a general manner.

In the article, Alyn Rockwood, Kurt Heaton and Tom Davis, "Real-Time Rendering of Trimmed Surfaces", Proceedings of the ACM, SIGGRAPH '89, Computer Graphics, Volume 23, Number 3, July 1989, pp. 107-116, a technique to break down a complex trimmed NURBS surface into triangles before rendering is described. This technique however, repeatedly performs complex, time consuming process steps for each rendered view of the image.

SUMMARY OF THE INVENTION

A unique graphics pipeline and method for utilizing the same to render trimmed NURBS surfaces is described. A NURBS (non-uniform rational b-spline) surface is a primitive which defines as a mapping from a bounded two-dimensional parameter space into a set of points that compose the surface. To render a graphics primitive such as a trimmed NURBS, the primitive first is processed through a compilation step, followed by a two phase traversal step and a display step. By compiling the graphics primitive prior to traversal, the NURBS surface is reduced at creation time into a form amenable for fast processing subsequently during traversal.

A key feature of the information produced by compilation is that it is independent of the tessellation step size; therefore the information remains valid under heavy changes to modeling and/or viewing transformations. Furthermore, a substantial portion of the processing complexity for rendering the primitive is absorbed at compilation, thus minimizing the complexity of tessellation at traversal. Therefore, subsequent renderings of the same primitive (e.g. different views) utilize the compiled information for rapid traversal and display.

At compilation the trimmed NURBS is broken down into monotone v-regions which remain valid for subsequent views and renderings. The NURBS is examined to determine the significant portions of the NURBS. The NURBS is then reduced to Bezier components (or "patches"). The defined trimming loops for the NURBS are also reduced to the Bezier level such that the relevant portion(s) of the trimming loops are associated with the Bezier component it affects. Each Bezier patch is reduced to one or more u-v monotone regions, called "v-regions," bounded by portions of the relevant trimming loops. As mentioned, these steps need only be performed once; different views and renderings of the same primitive do not affect the v-regions generated.

Once the graphic primitive is processed through the compilation step, the primitive is processed through the traversal step. The traversal operation is split into two phases. The first phase is algorithmically complicated. Therefore it is advantageous to run the first phase on a general purpose computer system. The second phase is algorithmically simple and requires a limited amount of memory but it is floating point intensive and repetitive; therefore, it is preferred that the second phase be run on fast, dedicated processors such as floating point processors. However, as the primitive has been broken down into monotone v-regions, the burden of generating the image can be distributed among the processors for processing in parallel.

In Phase I of the traversal, the uniform step size for each patch is determined. During Phase II of traversal, the trimmed NURBS is tessellated into a plurality of triangles by tessellating each monotone v-region determined during compilation. Lighting calculations are then performed and the pixel data representative of the trimmed NURBS is stored in a frame buffer. The frame buffer is accessed by the display controller which controls the display to actuate each pixel at a color and intensity indicated by the pixel data.

The process provides for a distributed fast and cost-effective system to render trimmed NURBS. The complex processing performed during compilation is performed on the host system. However, the processing required during compilation need only be performed once over multiple traversals. The information generated during compilation is reusable under varying modeling and viewing transformations, consistently meeting size and/or deviation thresholds in display coordinates.

Phase I of the traversal may be performed at the host processor or alternately by a general purpose co-processor programmed to determine the step size for tessellation of each patch. As the trimmed NURBS has been broken down into Bezier patches, each containing all the information required for tessellation, the traversal Phase II step may be implemented by a plurality of dedicated processors, operating in parallel, to tessellate each patch, perform lighting calculations and convert each triangle into pixel data for storage in the frame buffer. Further, since each trimmed Bezier patch has been broken down into v-regions, v-regions can be processed in parallel also. The display controller then accesses the frame buffer and activates the corresponding pixels in the display device.

BRIEF DESCRIPTION OF THE DRAWINGS

The objects, features and advantages of the present invention will be apparent to one skilled in the art in view of the following detailed description in which:

FIGS. 6a–6h respectively illustrate types of extreme vertices and intercept vertices.

FIGS. 7a–7e illustrate different optimizations of trimming chains.

FIGS. 8a–8i illustrate possible u-v monotone v-regions which may occur.

FIG. 18a illustrates an adjacency strip and FIG. 18b is exemplary pseudo code to generate an adjacency strip.

FIGS. 19a and 19b illustrate a stitching strip and FIG. 19c is exemplary pseudo code to generate a stitching strip.

DETAILED DESCRIPTION OF THE INVENTION

Figure 1:
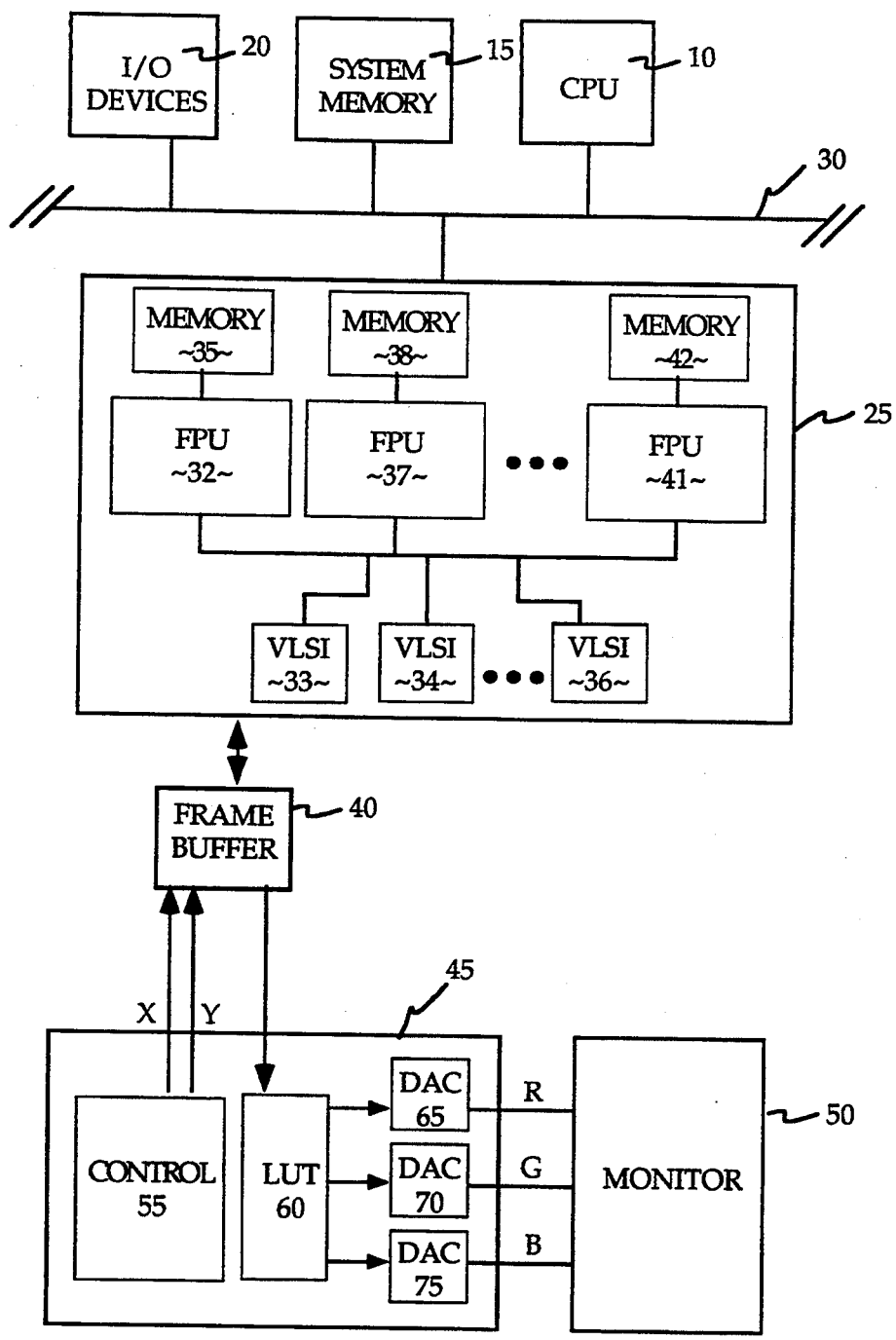
FIG. 1 is a conceptual block diagram illustrating a preferred embodiment of the system of the present invention.

A unique graphics pipeline and method for utilizing the same renders complex trimmed NURBS primitives in such a manner that complex operations requiring significant time and overhead are processed once for a primitive to generate sub-elements of the trimmed NURBS which retain the characteristics of the patches which form the NURBS and the portions of the trimming loops for each patch. These elements can then be processed independently and in parallel for each rendering of the trimmed NURBS to provide a fast but accurate rendering of the trimmed NURBS.

The method and apparatus for the present invention provides for the dynamic rendering of trimmed NURBS surfaces in a computer graphics system. The present invention performs a tessellation of the curved surfaces of the trimmed NURBS into appropriate sized triangles depending on the spatial relation of the surface to the eye-point. This relationship tends to be highly varying in interactive graphics applications and hence, the choice of appropriately sized triangles needs to take place repeatedly. This provides strong motivation for dynamic tessellation of trimmed NURBS surfaces. NURBS are powerful geometric primitives which are becoming quite popular in modern geometry related standards and systems, for example, PHIGS-plus.

NURBS are piece-wise polynomial functions that are capable of representing both conic and free form curved surfaces. A NURBS (non-uniform rational b-spline) surface is defined as a mapping from a bounded two-dimensional parameter space into a set of points that compose the surface:

$$S(u,v) = \sum_{i=1}^{n} \sum_{j=1}^{m} B_{i,k}(u) B_{j,l}(v) P_{i,j}$$

where $S(u,v)$ is the surface, $P_{i,j}$ represents an $n*m$ array of DeBoor control points, $B_{i,k}(u)$ and $B_{j,l}(v)$ represent the ith and jth B-spline basis functions of order k and order l, defined by the knot vectors $\{U_p\}$, $p=1$ to $n+k$ and $\{V_q\}$, $q=1$ to $m+l$, respectively, and u,v are the parameters, $U_k \leq u \leq U_{n+1}$, $V_l \leq v \leq V_{m+1}$. Thus, the NURBS surface is defined by a set of DeBoor control points in 3D space, and knot sequences in the U and V directions in 2D parameter space.

NURBS exhibit the local control property and offer modeling flexibility while avoiding the use of high degree polynomials. At the same time, NURBS exhibit the properties of Bezier surfaces which are single polynomial functions. NURBS can be evaluated by multiplication and addition operations.

Typically, the B-spline has a rectangular topology. If only a portion of the surface is to be used, trimming loops are defined in parameter space to define a portion of the surface. These trimming loops are 2D NURBS curves jointed end-to-end. The regions outside the trimming loops are not used. The trimming loops allow the composition of several NURBS surfaces and essentially provide the composite NURBS primitive. This capability makes trimmed NURBS very important as they overcome important limitations of non-trimmed NURBS primitives.

The system of the present invention is conceptually illustrated by the block diagram of FIG. 1. A CPU 10, system memory 15, Input/Output (I/O) devices 20 and a display processor system 25 are coupled via a system bus 30. The CPU 10 functions as the central or host processor and typically executes application programs that generate the curved surfaces generated and display in accordance with the present invention. The CPU 10 functions as a powerful general purpose processor and utilizes the available resources such as the system memory 15, I/O devices 20 and other peripheral devices (not shown) to execute complex programs and processes. The CPU 10 may be configured into a system, for example, a computer workstation such as those manufactured by Sun Microsystems, Inc., Mountain View, Calif.

As will be more fully described subsequently, the display processor 25 system is specifically configured to execute simple, but highly repetitive and computation intensive processes required as part of the process for rendering curved surfaces. The system 25 consists of one or more floating point processing units (FPU) 32, 37, 41 and one or more memories 35, 38, 42 and at least one dedicated VLSI 33, 34, 36 or similar component that performs certain repetitive processes in a timely and cost effective manner. The display processor system 25 generates the pixel data representative of the visual representation of the trimmed NURBS to be rendered and stores the pixel data in the frame buffer 40. The pixel data is stored in the frame buffer 40 in a sequence readily identified with the x-y coordinate space of the display device 50.

The display controller 45 generates the display of the trimmed NURBS defined by the pixel data located in the frame buffer. The display controller 45 through its controller 55 cycles through the frame buffer, one scan line at a time in accordance with the raster scan rate, for example, 60 times a second. Memory addresses are generated by the controller 55 to access the pixel data. The pixel data is read from the frame buffer in sequence and input to the display controller color look-up table (LUT) 60. The LUT 60 contains the digital control signals used to control the intensity and color of the output, for example the beams, on the display device 50. The signals output by the LUT 60 are input to digital to analog converters (DACs) 65, 70 and 75 which generate the analog signals to control the energizing or generation of the location and intensity respectively of the red, green and blue components of the pixel to be displayed. The display device may be a raster scan device such as a cathode ray tube (CRT) or a hard copy device such as plotter. For purposes of explanation the display device will be a CRT; however it is obvious to one skilled in the art that other display devices may be utilized in accordance with the system of the present invention.

Figure 2:
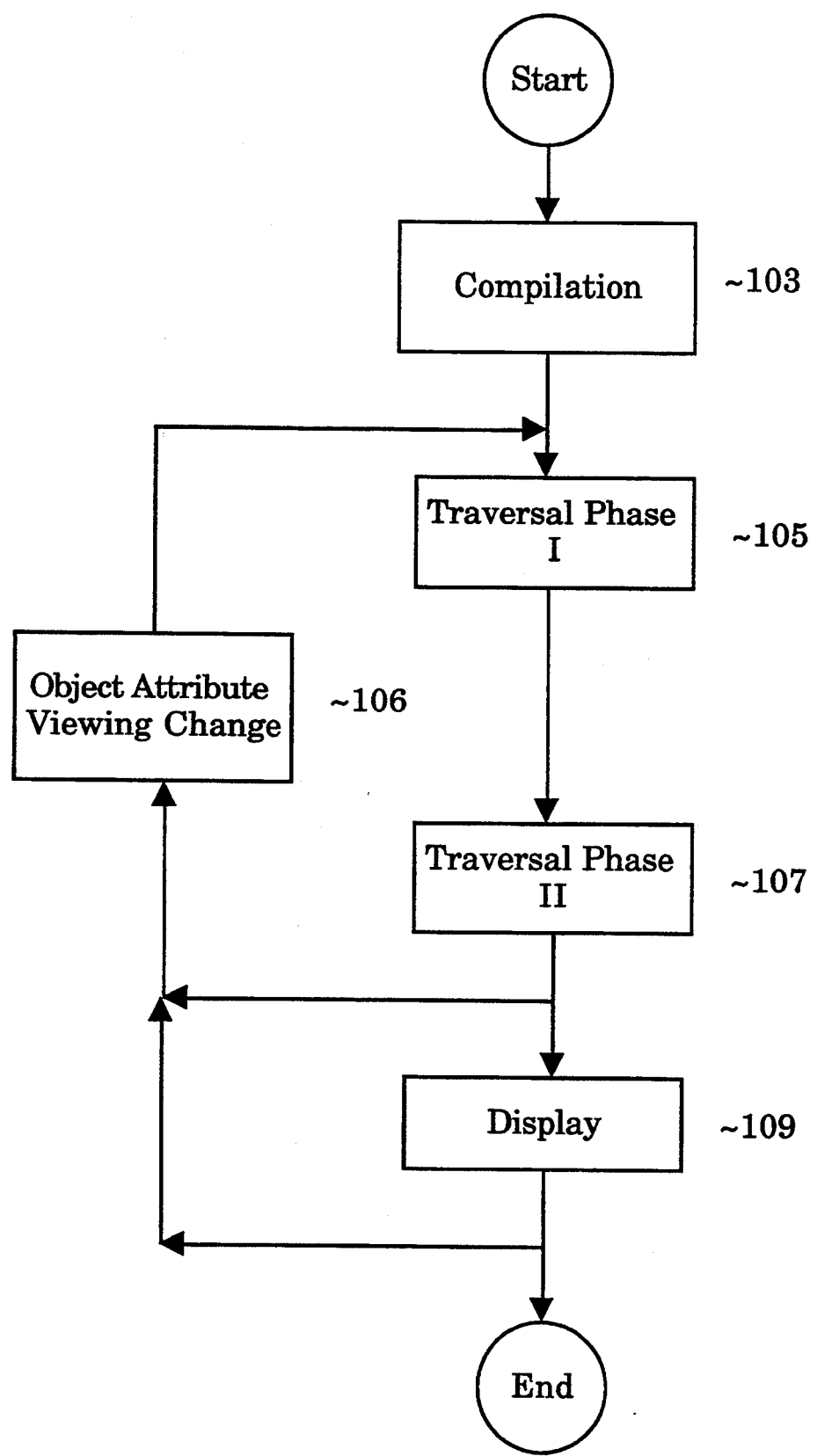
FIG. 2 is a flow diagram illustrating the overall process.

In the process of the present invention, the processing of trimmed NURBS surfaces is divided into four general steps. Referring to FIG. 2, the first step, 103, compilation, is a one-time operation that compiles the trimmed NURBS primitive into a compact view-independent form. Much of the complexity involved in the processing of trimmed NURBS is absorbed in this step. Each time the NURBS surface is traversed, this compiled form is used as input to the tessellation processing. The second step, 105, is the first phase of traversal and includes operations such as step size determination for tessellation. This phase is algorithmically complex but not computationally intensive. The third step, 107, is Phase II of traversal and is the phase where the actual evaluation of the surface and tessellation into triangles takes place. This phase is algorithmically simple, but computationally intensive. The differentiation between two traversal phases is based upon the capabilities of the graphics accelerator, but typically a general purpose front end processor such as the host processor processes the first phase and one or more special floating point processors that operate in parallel process the second phase. In this manner, the algorithmically complicated steps can be performed on the front end processor and the algorithmically simple but floating point demanding steps can be performed on the special floating point processors in a parallel manner. Once the triangles are tessellated, the triangles are quickly and easily processed to include shading and are converted to pixel data for storage in the frame buffer and, as performed during the fourth step, step 109, subsequent output to the display device.

An advantage to the present invention is the ability to re-use information previously determined with respect to the trimmed NURBS. For example, if the view were to be changed, step 106, information generated during compilation, step 103, can be re-utilized thereby avoiding the time consuming and costly computations incurred during compilation. Similarly, the process of the present invention may, in certain instances, reutilize certain information generated during Phase I of the traversal 107 if the rendering to be performed does not require a change of certain display parameters, e.g., the step size used for tessellation.

The compilation process will now be described with reference to FIG. 3. At block 310, the NURBS is reduced to a plurality of Bezier patches. This simplifies processing as each Bezier patch is a single polynomial which is easier to process. For information regarding the process of converting NURBS to Bezier patches, see for example, Boehm, Farin, Kahmann, "A Survey of Curve and Surface Method in CAGD," *Computer Aided Geometric Design*, vol. 1, pp 1-60 (1984). Boehm, et al, describes a process for converting NURBS into Bezier patches by insertion of knots and a change of basis.

Figure 4:
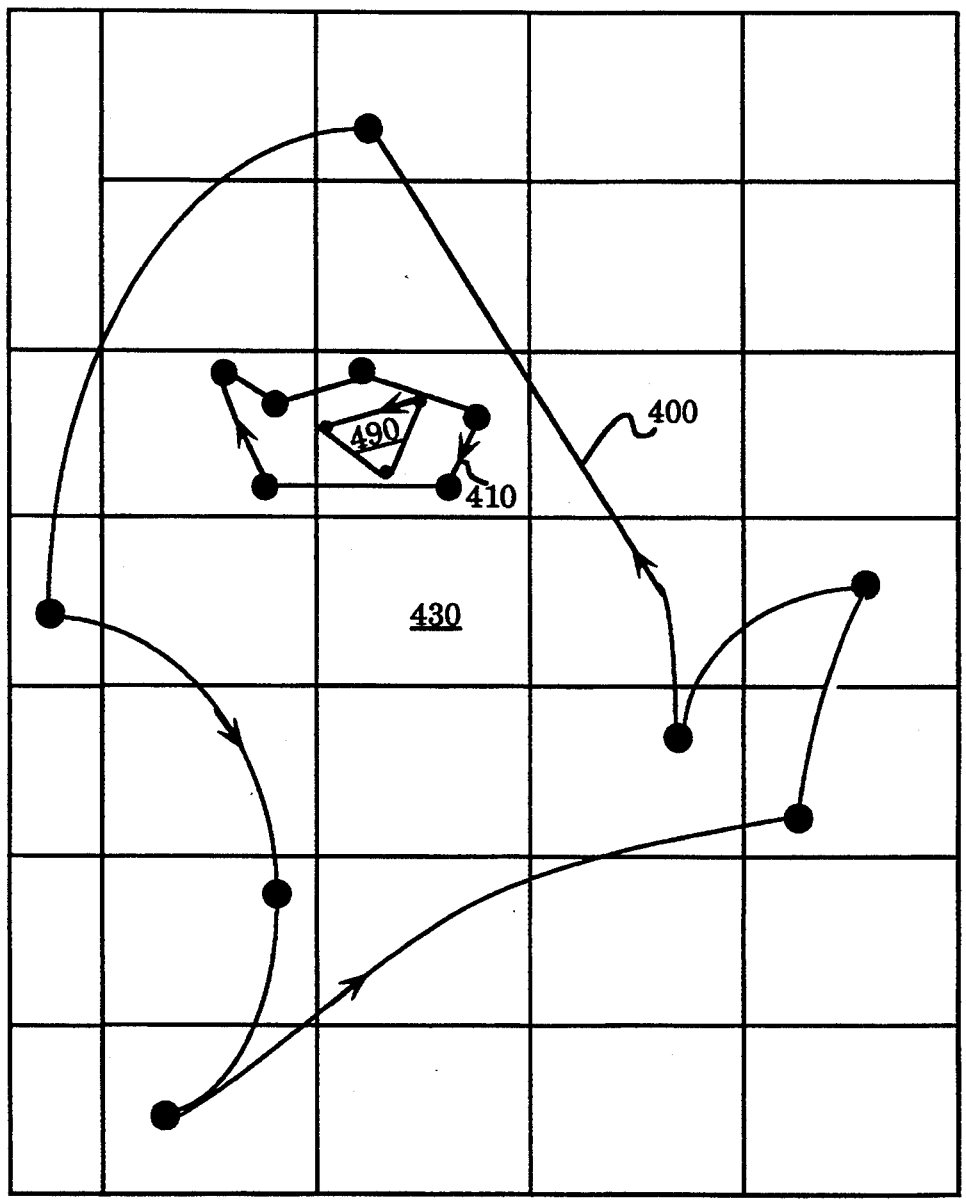
FIG. 4 illustrates three trimming loops in parameter space that are consistent with the odd-winding rule and left-handedness rule.

The significant portions of the NURBS are defined by the NURBS and its trimming loops. Each loop has a direction and is a closed loop. The significant region of the trimmed NURBS may be defined through the odd-winding rule or the left-handed rule; that is, the significant portion of the region is on the left hand side of every trimming curve. This is illustrated with respect to FIG. 4. FIG. 4 illustrates three trimming loops, 400, 410 and 420, which are consistent with both the odd-winding rule and the left-handed rule. Each loop has a direction as indicated by the arrows and by following, for example, the left-handedness rule the trimming loops 400, 410 and 420 define two significant portions. The first portion 430, delineated by trimming loops 400 and 410 and the second significant portion 440 defined as within trimming loop 420.

Figure 3:
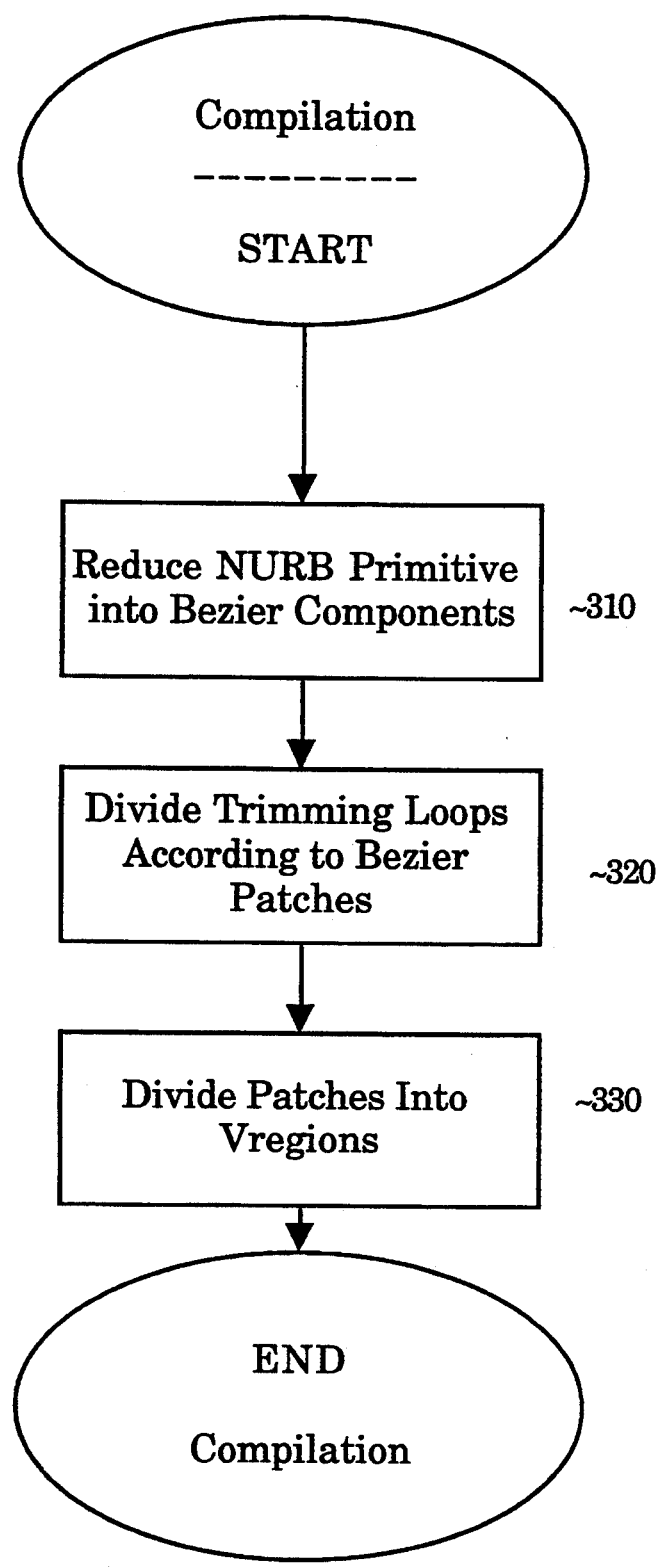
FIG. 3 is a flow diagram of the compilation process.

At step 320, FIG. 3, the trimming loops are sectioned such that the relevant portions of the loops are identified with the patch the trimming loop delimits or affects. Preferably, the following process is used to compile the trimmed patches. However, it should be obvious to one skilled in the art that other processes may be employed.

Figure 5:
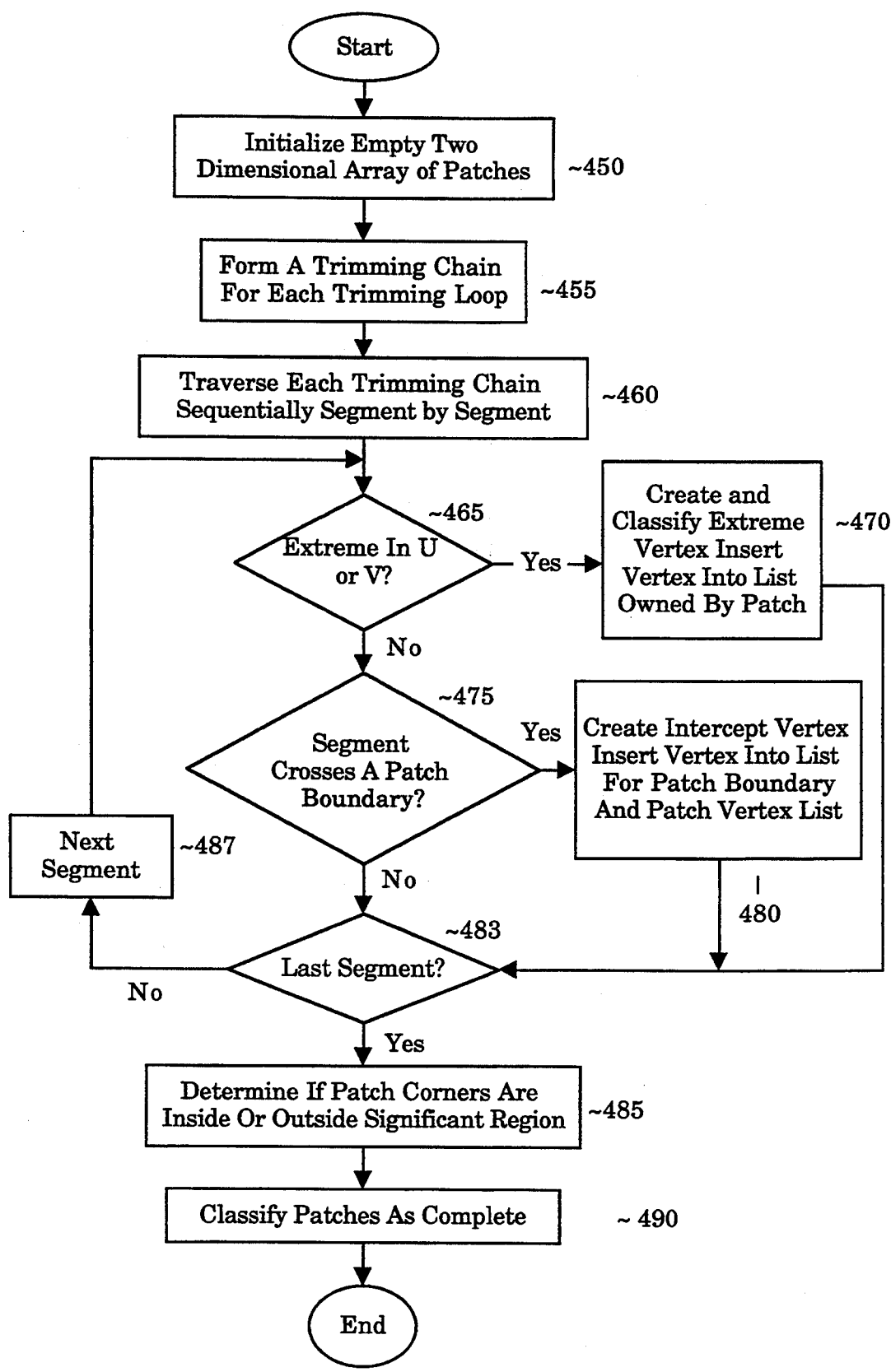
FIG. 5 is a flow diagram illustrating some of the details of the compilation process.

Referring to FIG. 5, the preferred embodiment for the compilation of trimming loops is described. At step 450, a two dimensional array of patches is initialized Empty. This array, once the compilation process is complete, will contain information identifying the class of each patch, the monotone v-regions which form each patch and information regarding boundary intercepts (utilized during traversal to perform stitching operations). Patches that remain classified as Empty are patches that have been completely trimmed out of the significant region. These patches are not processed during traversal. Patches classified as Complete are patches that lie completely within the significant region. Patches classified as Trimmed have trimming loops through the patch.

At step 455 a trimming chain is generated for each trimming loop. The trimming chain is an array of segments representative of the trimming loop. Each segment is a tuple (u,v, udir, vdir), where the terms u and v respectively identify the u and v coordinate of the segment and udir and vdir identify either a coordinate of the segment or if the segment is increasing or decreasing. Each segment may be a linear segment or a Bezier curve in parameter space.

The trimming curves are first broken down into Bezier polynomial pieces. If the trimming curves are initially piecewise linear, these pieces remain linear. If the trimming curves are not initially piecewise linear segments and the user wishes to tessellate trimming curves using a constant number of steps, these Bezier pieces are tessellated and broken down into linear segments. The result is that each trimming loop now consists of a chain of linear or Bezier segments.

At step 460 each trimming chain is sequentially traversed segment by segment to break the chain into monotone chains of segments. The first segment of the trimming chain is used to start a monotone chain. The patch in which the trimming chain starts is labeled in the array as Trimmed. Each subsequent segment in the trimming chain is examined. At step 465, the u/v extremes in the trimming chain are identified. A u/v extreme occurs if a segment has the opposite u/v direction as the previous segment, or if a Bezier segment has extremes within itself. At each extreme, an "extreme vertex" is created.

At step 470, the extreme vertex is classified and the vertex is inserted into a sorted vertex list associated with the patch. This list of vertices is sorted in decreasing v. For the present embodiment, the types of classifications are illustrated in FIGS. 6a–6f. A vertex is identified by the extreme type and consists of a reference to the appropriate segments which form the vertex. As will be described subsequently, the vertex list associated with each patch is referenced during the Phase I traversal process to generate the v-regions utilized in the process to render the trimmed NURBS on the display device. In addition, when an extreme is detected, the monotone chain is ended at the vertex and a new monotone chain is started.

If, at step 475, the segment crosses a patch boundary, an intercept vertex is created at the crossing point. If the boundary is a left or right boundary, the vertex is classified relative to both the left and right patches. The classifications for the present embodiment are illustrated by FIGS. 6g–6h. The intercept vertex is inserted in the vertex lists for patches. In addition, it is inserted in the sorted list of intercept vertices for the patch boundary. These lists have vertices sorted in decreasing v (top to bottom). These lists will subsequently be used to create v regions. The monotone chain is ended at the intercept vertex and a new chain is started. This process is continued, steps 465, 470, 475 and 480, for all segments.

The operations described above involve the determination of intersections of trimming segments with u/v iso-lines which identify the boundaries of patches and the identification of extremes within the segment. To perform these operations on Bezier curve segments, a root-solving algorithm is preferably used. For example, see Philip Schneider, "A Bezier Curve Based Root Solver," *Graphics Gems*, edited by Andrew Glassner, (Academic Press, 1990).

Intersections with iso-lines are computed by finding the root of the Bezier curve shifted to a coordinate axis. Extrema are found by finding roots of the first derivative of the Bezier curve. Using the root solver, the extremes and patch crossings are determined in terms of the parameter value at which the extreme or patch crossings occurs.

The Bezier curve is then broken at that parameter value into two curves, having a common endpoint at the parameter value. This technique provides the information needed to continue compilation and traversal without tessellating the curves into line segments.

As the determination of roots is computationally intensive, the unique properties of Bezier curves are exploited to minimize the need to determine the roots. In these cases, a preliminary check is made on the control points before using the root-solver. For example, it can be assumed that only if the control polygon (found by joining the control points of the Bezier curve) has an extreme, the curve itself will have an extreme. Similarly, only if the control polygon crosses a patch boundary, the curve will cross the boundary. Thirdly, u/v states and vertex classifications are computed using the end-point interpolation property of Bezier curves (i.e., the slope of curve equals slope of the polygon at the end points of the polygon).

A NURBS is formed by a plurality of Bezier patches separated by knot lines. The patches appear rectangular and have boundaries delineated by u knot lines and v knot lines. The patch corners are defined at the intersection of a u knot line and a v knot line. Upon completion of analysis of the trimming curves, a compilation of patch boundary intercepts and extremes is available for each patch. Using this information, once all the trimming curves have been processed, at step 485 the patch corners are reviewed in a row by row fashion to determine those corners of each patch which are inside and those corners which are outside the significant region. Consistent with the odd winding rule, if a ray is extended from the surface and it crosses an odd number of patch boundaries (i.e. knot lines), then the patch is within the significant region. If the ray crosses an even number of patch boundaries then the patch is completely outside the significant region. This can be easily accomplished by inspecting the number of intercepts the v-knot line contains to the left of the corner. If this number is odd, then by using the odd-winding rule, the corner is inside the significant region. This number may be easily determined from the sorted vertex list for the boundaries which are v-knot lines. In particular, the patch boundary list is examined to determine the number of patch crossings by trimming curves to the left or below the corner. If the number of crossings is odd, the corner is inside the significant region.

At step 490, the patches that are not affected by trimming loops are classified as Complete if the top left corner of the patch is inside the trimming loop and no trimming loops pass through the patch. By performing the above steps, the NURBS trimming information is reduced or broken down to the patch level. Thus, subsequent processing of trimming can be independently performed on a patch by patch basis.

Preferably the processing of trimming loops takes into account a number of special cases. These are handled by identifying a set of conventions that are followed when tracing the trimming chains thereby avoiding special case handling by providing the solution for the general case. The conventions chosen are influenced by the left-hand rule that the trimming loops are based upon.

The first convention specifies that a horizontal or vertical trimming segment is to be classified and treated as if it is slightly pivoted to the left side. This is well defined given that the trimming segment is oriented according to the left-hand rule. This convention also accommodates the case where the trimming segment overlaps a knot line, as the segment is oriented in the horizontal or vertical direction.

The second convention specifies that a trimming segment that ends exactly on a knot segment is treated as if it falls infinitesimally short of the segment. Therefore, the vertex is not identified in the patch boundary list. As a consequence, if the next consecutive trimming segment continues into the adjacent patch, it is treated as if it properly intersects the knot segment such that one segment is identified with the patch boundary. Otherwise, if the consecutive trimming segment does not continue into the adjacent segment, no intersection with the knot segment is registered and the point on the boundary is treated as if it doesn't lie on the boundary in the patch boundary list.

FIG. 7a illustrates the first convention for treating horizontal (2) (4) or vertical (1) (3) trimming segments as if they are slightly pivoted to the left side as indicated by the arrows shown. FIG. 7b illustrates the second convention where a point on the boundary is treated as if it falls short of the boundary.

The third convention specifies that if a trimming segment crosses a corner point, which is an intricate section of knot lines, the segment is treated as if it is shifted slightly to the left-hand side. This is illustrated in FIG. 7c which shows two segments in opposite directions which cross a corner point each having a second adjacent segment shifted slightly to the left.

Figure 7D:
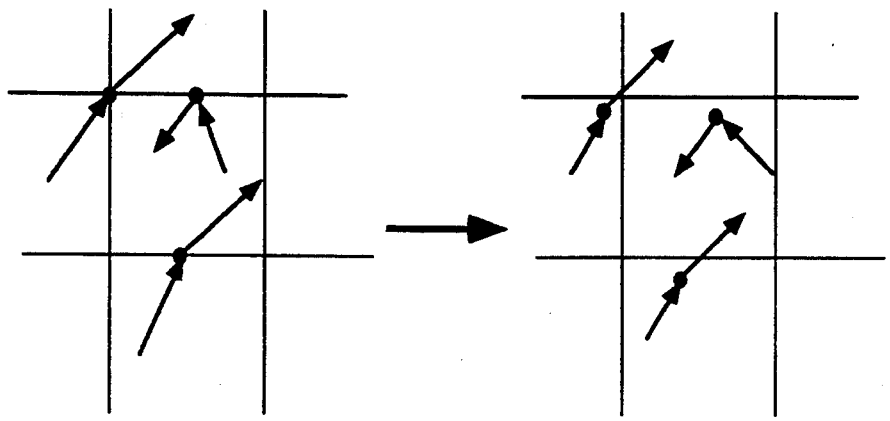

The next convention specifies that if the starting point of a trimming chain coincides with a corner or lies on a boundary, the point resides on a knot line, and the point is treated as if it is shifted slightly from the knot line(s). If the point lies on the B-spline boundary, it is treated as if it is shifted into the patch. For example, a point on the left boundary of the left most patch is treated as if it is shifted to the right. Alternately, a point is treated as if it is shifted into the patch where the trimming chain ends. That is, the point is treated as if it is shifted such that the last segment in the chain does not have to cross the knot segment that the point lies on. This is illustrated in FIG. 7d.

Still another convention may be used in the establishment of precedence among types of vertices so that extreme vertices that are coincident can be inserted in the sorted list. For example, given two vertices of extreme types 2B and 3A that are coincident, the 3A vertex is given precedence (see FIGS. 6a–6f) because the trimming loop it belongs to comes above and should be processed first. Preferably this is achieved by providing a lookup table of the different types of vertices which may occur in different configurations and identifying the precedence for each configuration.

Figure 7E:
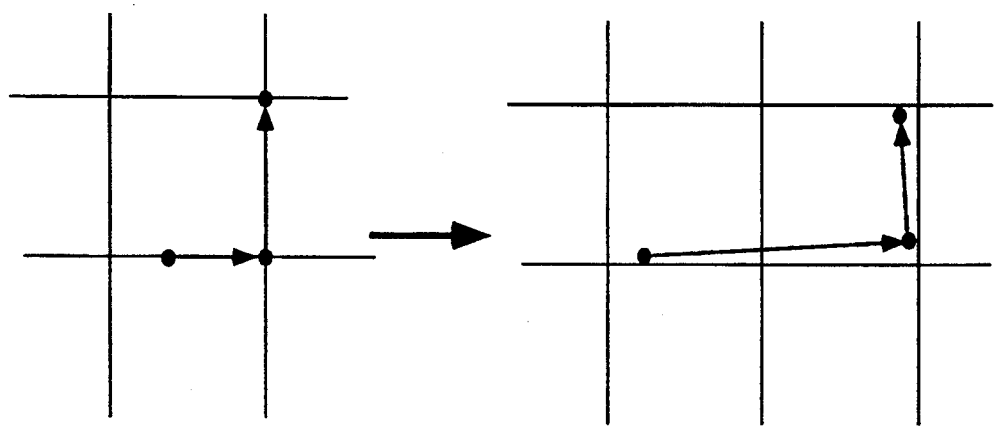
Figure 8E:
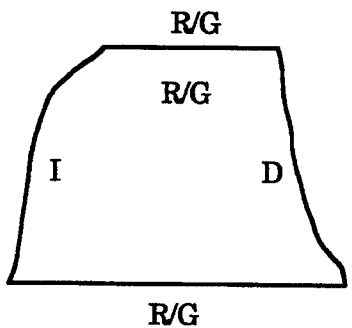
Figure 8F:
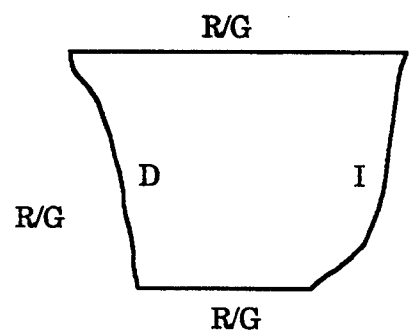
Figure 8G:
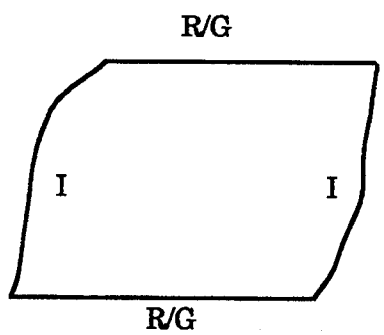
Figure 8H:
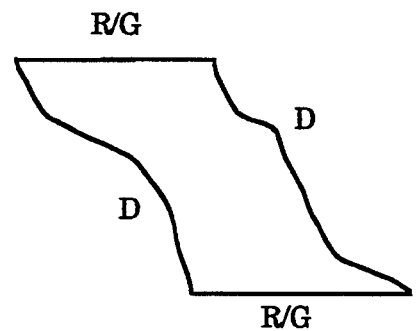
Figure 8I:
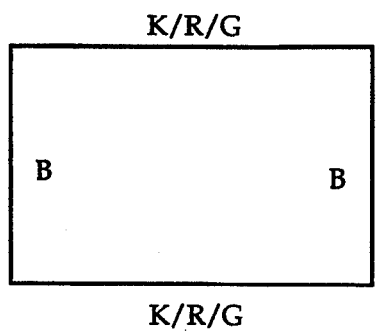

These conventions are applied in combination for certain combinations of these cases. For example, as shown in FIG. 7e, a trimming segment that overlaps a knot line and ends at a corner is treated as if it is pivoted left and is short of the perpendicular knot line where it ends.

After the trimming loops have been processed during compilation, the following information is now available for each patch:

1) A list of u–v monotone trimming chains that run through the patch. Each monotone chain consists of a start vertex, an array of trimming segments and an end vertex.
2) A list of extreme vertices identified by type sorted in decreasing V order. The list preferably contains a pointer, the segment information regarding what type of extreme it is and pointers to the two monotone segments it joins.
3) Sorted patch boundary lists of intercept vertices for the four boundaries of the patch. These preferably contains a list of vertices sorted by top to bottom or left to right. It should be noted that intercept vertices on a left/right patch boundary, have two vertex types (one for each patch).

The information regarding each patch may be maintained in a variety of types of data structures and formats. For example, the boundary and corner information may be owned and maintained by a border grid or skeleton object with respect to the entire surface to be rendered. The information regarding the extremes would then be owned and maintained by each patch object. Each extreme or border vertex identifies the u,v coordinates of the extreme, the type of extreme and pointers to the two monotone chains it joins.

Referring back to FIG. 3 at step 330, the patches are then divided into what is herein referred to as v-regions. These monotone v-regions have certain characteristics that provide for rapid traversal. A monotone v-region is constructed of a top and bottom base which are horizontal in orientation, and a left and right side. FIGS. 8a–8i illustrate the primary set of possible u–v monotone v-regions types that can occur, where K represents a v-knot base segment, R represents a regular base and G represents a base having a vertex of a type which indicates a potential gap. The left and right sides each consist of a chain of u–v monotone trimming segments, which may be linear or Bezier segments. The sides are classified as decreasing in u (D), increasing in u (I), or as a border (B), which indicates the left or right boundaries of the patch. The traversal time processing is dependent upon the types of left and right sides. Thus, at compilation we classify each v-region into one of the nine types as shown in FIG. 8.

Figure 9:
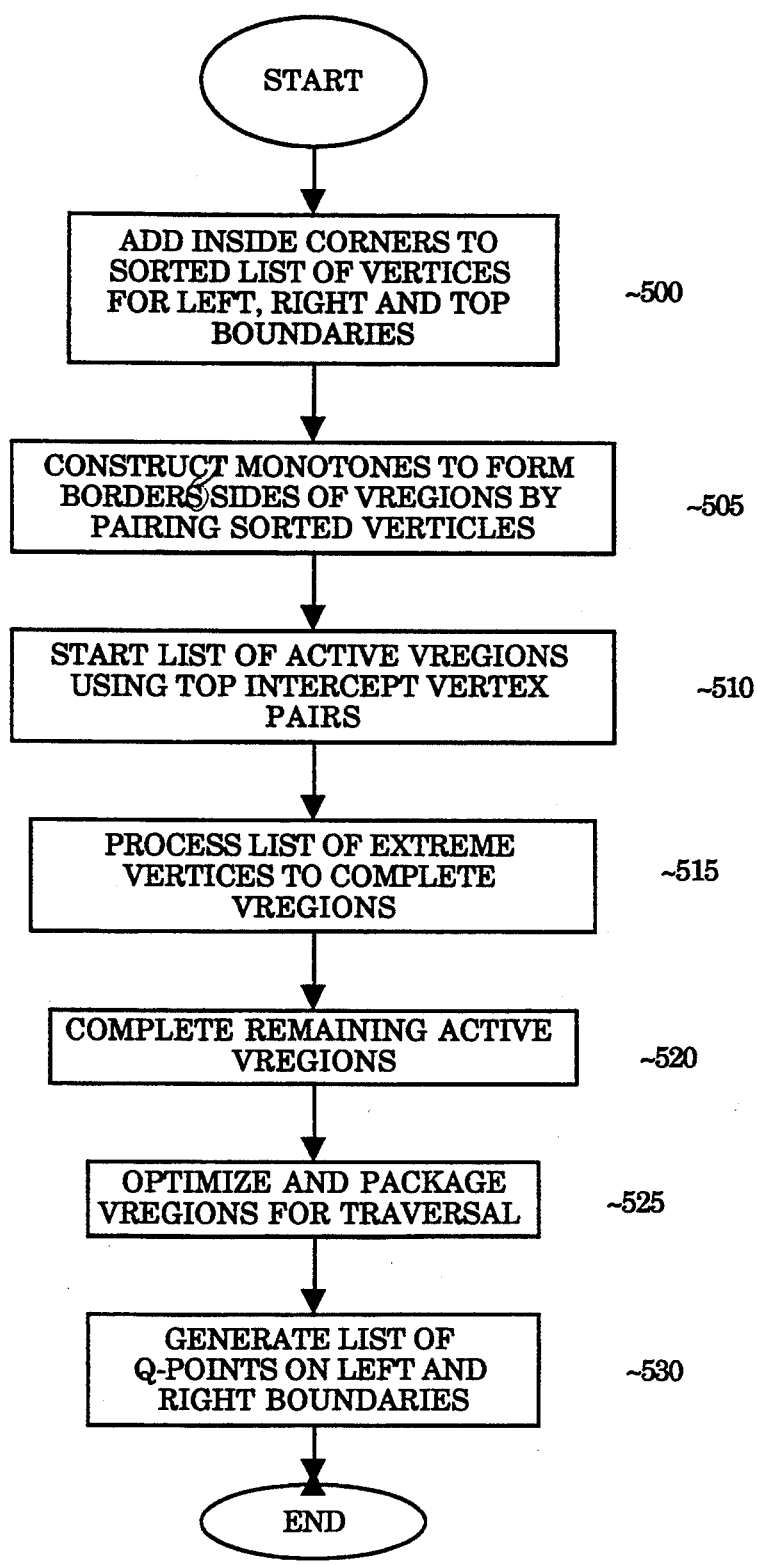
FIG. 9 is a flowchart illustrating the process of determining v-regions in accordance with the present invention.

The process for finalizing the v-regions is set forth in FIG. 9. At step 500, the sorted boundary list of intercept vertices for the left, right and top patch boundaries previously determined are accessed, and the patch inside the significant region corners are added to the list. At step 505, the left/right border intercept vertices(-which are sorted top to bottom) are taken in corresponding to the side borders of the v-regions. At step 510, top intercept vertex pairs (the pairs having the greatest v coordinate value) are identified as the beginning of active regions. Active regions are v-regions that have their top base defined but have not yet had the bottom determined. Processing is then begun to determine the bottom border in order to complete the active v-regions. Therefore, at step 515, each vertex in the sorted list of extreme vertices are processed.

The types of vertices are determinative of the formation of v-regions. Referring to FIGS. 6a–6h for example, a vertex of type 1a and 1b indicate the completion of an active v-region and the activation of a new one. Such a vertex will be at the bottom of the left/right side of an active region. A horizontal line is cast through the vertex and dissects the monotone chain of segments which forms the other side of the v-region to form two chains of segments. The horizontal line indicates the bottom base of the v-region and the top base of the new v-region which is opened. The dissection of the chains of segments may be achieved using a binary search routine to locate the correct segment to intersect. A new vertex is formed at the intersecting point. If the intersecting segment is a Bezier curve, the root-solving algorithm is preferably used to compute the intersecting point.

A vertex of type 2a indicates the completion of an active region and the activation of two new ones. This is achieved by finding an active v-region which encompasses this vertex. A horizontal line 533 is cast through the vertex to delineate the bottom of the active region and the top of two new regions, one region located to the left and one region located to the right of the vertex.

The u,v coordinate value of the vertex is maintained along with the information identifying the bottom base of the completed v-region. As will be explained subsequently, this information is utilized during traversal to avoid a potential gap which may occur subsequently during tessellation. By maintaining this information with each affected v-region, independence among v-regions is achieved and therefore parallel processing of v-regions during traversal can be performed.

A vertex of type 2b indicates the activation of a new v-region. A vertex of type 3a indicates the completion of an active v-region. A vertex of type 3b indicates a completion of two v-regions and the start of a new v-region. The v-regions that end at this vertex are identified and the two new v-regions are identified by casting a horizontal line 534 through the vertex. This u,v coordinate value of the vertex is identified with the top border of the new active v-region as a possible gap between v-regions may occur during traversal.

At step 520, the remaining active v-regions are completed by identifying portions of the bottom patch boundary as the bottom bases. At step 525, the v-regions are optimized and packaged for subsequent traversal. For example, the degenerate v-regions are eliminated. The degenerate v-regions are those regions which have top and bottom bases coinciding and do not have a vertex which is identified as having a potential gap. The order of segments, identified by the monotone pairs of intercept vertices from the intercept list which are on the left side, are reversed in direction or order such that both sides of the v-region have segments going from bottom to top. In addition, the segments define by the intercept vertices are transformed to the local coordinates of the patch parameter space as the trimming loops are defined in the parameter space of the B-spline. At step 530, sorted lists of Q-points on the left and right boundaries are generated for each v-region. The Q points are the new points that are generated due to the "chopping" that occurred when completing one v-region and starting a new active v-region. Sorted lists of intercept points and Q points are generated. These Q-points, as will be explained subsequently, are used in stitching gaps between adjacent patches.

Once the v-regions have been compiled, each v-region can be tessellated and independently according to the classification generated during compilation. This lends itself to parallel processing by fast, dedicated processors to rapidly tessellate and generate a display of the trimmed NURBS. At the end of compilation, each v-region is defined by a top and bottom base each classified as regular, knot or gap; a left and right side each of which consists of a u–v monotone sequence of linear/Bezier segments which are increasing in v and increasing or decreasing in u, if the side is formed by trimming loops or consists of two points which identify the endpoint of a border of the patch.

Figure 10:
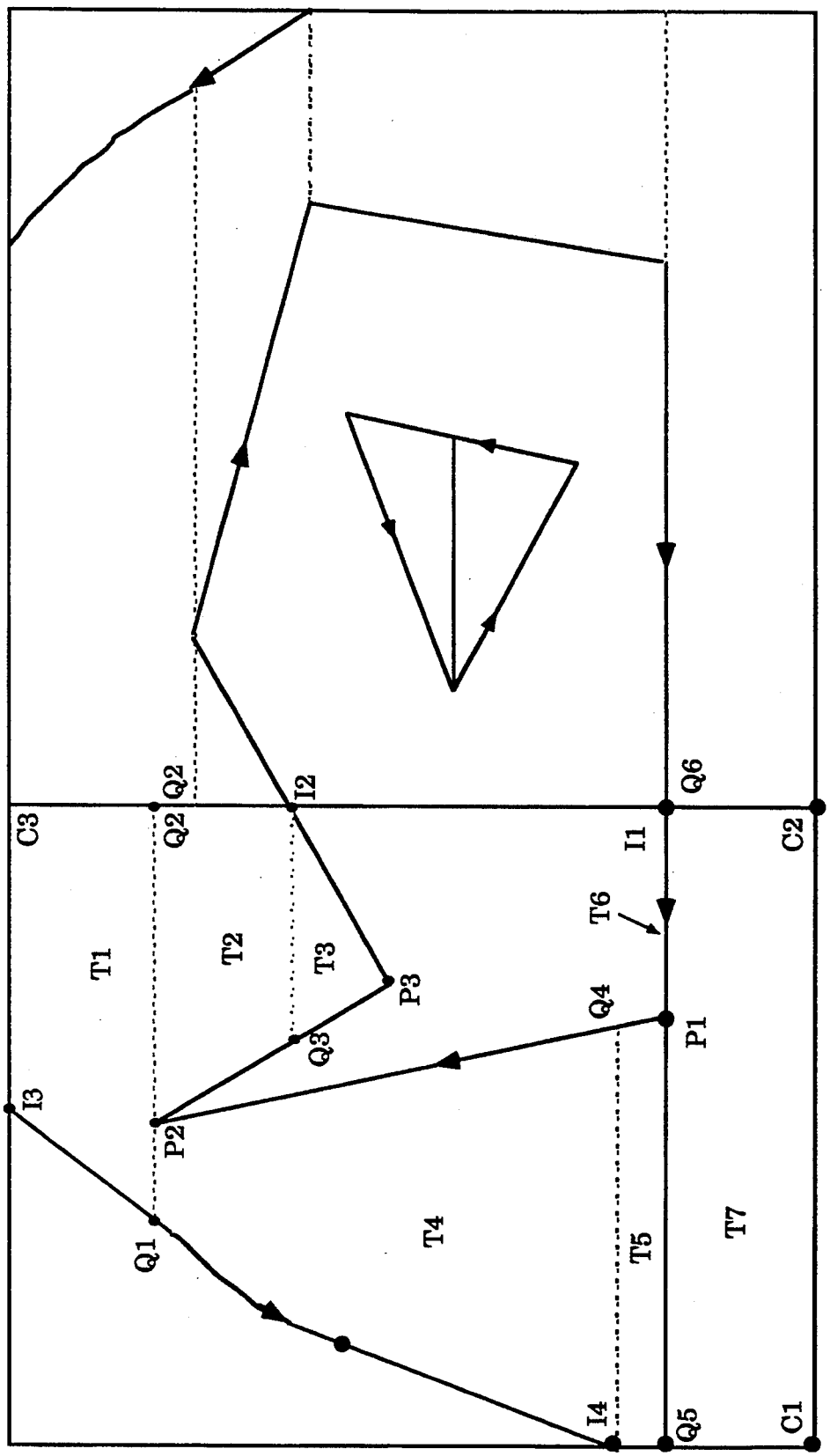
FIG. 10 is an exemplary trimmed NURBS with v-regions determined in accordance with the present invention.

FIG. 10 illustrates an example of compilation of a trimmed NURBS. In particular, this figure will be used to detail the steps for compiling one of the patches of a trimmed NURBS. The trimming loops are first converted (not tessellated in case of Bezier) into trimming chains. The chains are traversed and intercepts and extremes for each patch are identified which results in a list of u–v monotone sub-chains per patch. The inside patch corners to the significant region are then identified.

Referring to FIG. 10, compilation of the two trimming loops results in identifying intercepts (I3/1A) and (I4/1A) on one loop and intercepts (I1/2B) and (I2/1B) and extremes (P1/3B), (P2/2A) and (P3/3A) on the other loop. The vertices that do not lie on the top or bottom v-knot segments are sorted in decreasing v order, to result in vertices in the following order: (I3, P2, I2, P3, I4, P1, I1). Even though vertices I1, and P1, have the same v value, I1 is treated as "higher" than P1, because of the conventions described above. For vertices on the top v-knot segment or those vertices with types 1A, 1B, 2A, or 2B, descendent monotone chains and their types are determined. In particular I3-I4(D), C3-I2(B), P2-PI(I), P3(I), I1-PI(D), C2(B), and I4-C1(B). It should be noted that D or I are sufficient labels to indicate orientation as v is assumed to be decreasing and indicate "regular" patches. Therefore, it is only necessary to indicate how the segments are oriented in the u direction.

Once the vertices are identified, the v-regions are constructed. The vertices at the top v-knot line are accessed and each set of vertices are examined in decreasing v order until the vertices on the bottom v-knot line are reached. Therefore, a v-region is activated identifying (I3-I4(D), C3-I2(B), R) based on inspection of the top v-knot segment. The next vertex (P2/2A) (i.e., the vertex at point P2 of type 2A) is processed. P2 is inside an active region as it is of type 2A. Points Q1 and Q2 are then determined and form v-region T1: (I3-Q1(D), C3-Q2(B), G(P2), R). Two new v-regions are then activated identified initially by (Q1-I4(D), P2-P1(I), R) and (P2-P3(I), Q2-I2(B), R). The next vertex I2 is then processed. I2 is of type 1B and therefore is at the bottom of the right side of an active v-region. The Q point Q3 is determined and the v-region is closed. This is identified as T2: (P2-Q3(I), Q2-I2(B), R, R).

The next vertex P3 is processed. P3 is the type 3A and closes the active v-region T3: (Q3-P3(I), I2-P3(D), R, P). The next vertex is processed from the list. I4 is of type 1A and is therefore at the bottom of the left side of an active v-region. A horizontal line is drawn across and the point Q4 is determined and the v-region T4 is closed: (Q1-I4(D), P2-Q4(I), R, R). As v-region T4 is closed, a new v-region is opened using the points (I4-C1(B), Q4-P1(I), R). The next vertex I1 is processed and is of type 2B. Therefore, a second v-region is opened, formed by points (I1-P1(D), I1-C2(B), P). The next vertex P1 is then processed. P1 is the right descendent and left descendent of two active v-regions, i.e., a right side and a left side of two active v-regions converge at point P1. Points Q5 and Q6 are determined to generate and close the following v-regions:

T5:(I4-Q5(B), Q4-P1(I), R, R)
T6: (I1-P1(D), I1-Q6(B), P, R)

As part of the optimization procedure it is determined that region T6 is of zero height and therefore is ignored for subsequent processing. A new v-region is then activated using points (Q5-C1(B), Q6-C2(B), G(P1)). Any active v-regions are then completed by labeling their bottom bases as nothing else is to be changed. This results with region T7; (Q5-C1(B), Q6-C2(B), G(P1), K). Therefore, during compilation, seven v-regions T1-T7 are identified in the patch.

Figure 11:
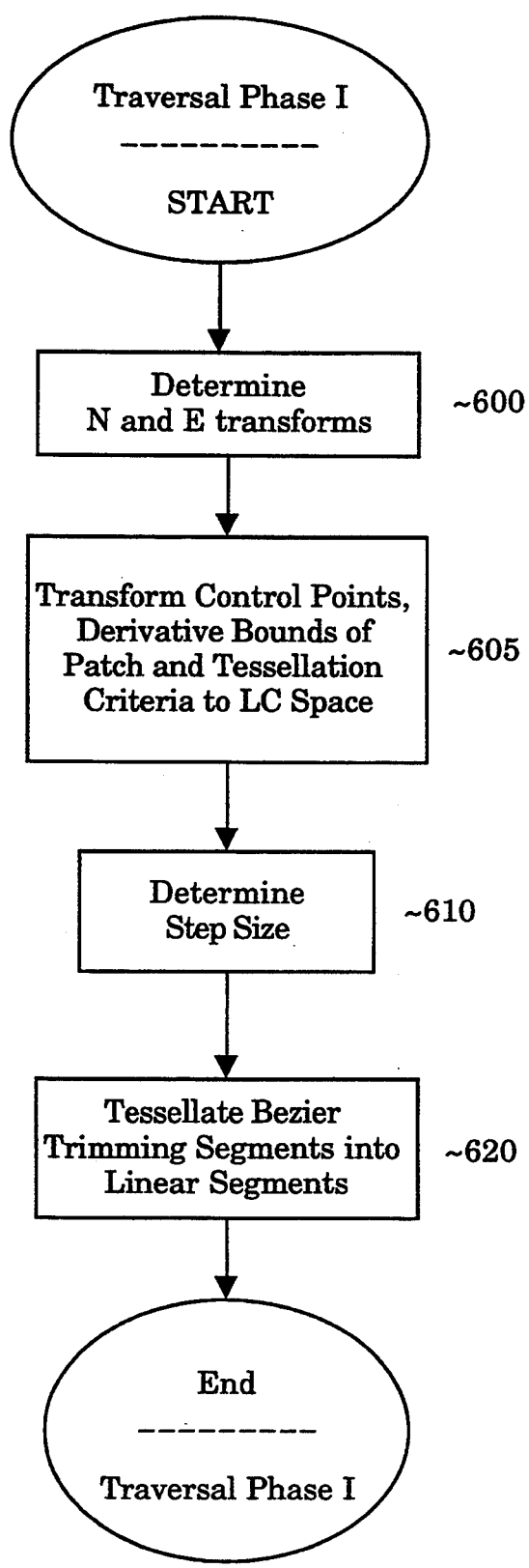
FIG. 11 is a flowchart illustrating the Phase I traversal process.
Figure 12:
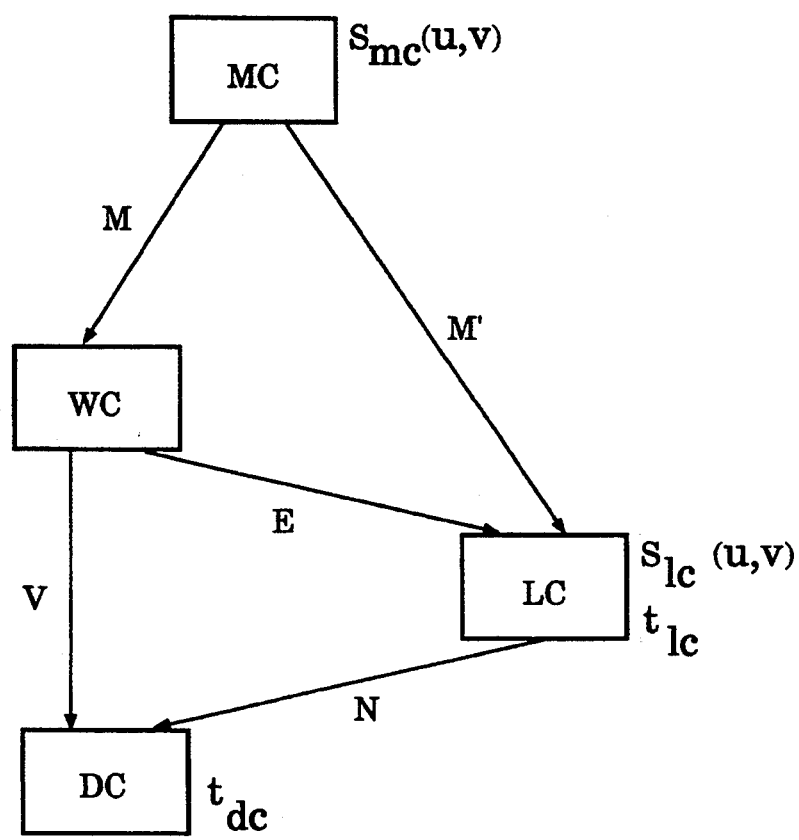
FIG. 12 illustrates the different coordinate spaces utilized during the rendering process.

The phase I traversal process is initiated once compilation is complete. Referring to FIG. 11, an overview of the Phase I traversal process is described. At step 600, the transformations between coordinate systems are determined. In the process of the present invention, referring to FIG. 11, graphical objects are defined in an object coordinate or modeling coordinate (MC) system. Objects are transformed into the world coordinate (WC) system by a modeling transformation "M". The world coordinate system is the coordinate system in which the graphic object is represented in the computer. Through the transformation "V", the graphic object in the WC system is transformed to the Device Coordinate (DC) system which corresponds to the screen space of the computer display. An additional coordinate system, the Lighting Coordinate (LC) system, is provided. The LC system is reached from the WC system through a rigid, but computation intensive transformation "E" and the DC system is reached from the LC system through sparse "N" transformation. For further information regarding the LC space and transformations for the same, see Salim Abi-Ezzi and Michael J. Wozny, "Factoring a Homogeneous Transformation for a More Efficient Graphics Pipeline", Computer and Graphics, Vol. 15, No. 2, pp. 249-258, 1991.

As noted earlier, tessellation criteria is generally specified in the DC system. If the tessellation is performed in DC space, adaptive techniques may be easily applied to compare the resultant triangles to the threshold and adjust the tessellation step size parameter as necessary. Although tessellation may be performed in the DC system, the resultant triangles are inappropriate for performing subsequent lighting calculations. The "V" transformation which transforms the graphic object from the WC space to the DC space is a non-rigid transformation; therefore the triangles in DC space do not maintain all the dimensional characteristics specified in MC and WC space. Lighting calculations performed on the distorted triangles result in distorted lighting and images with distorted shading. In addition, the V transformation employs a 4×4 homogeneous matrix which is computationally expensive. Furthermore, if the triangles are tessellated in WC space and transformed to DC space, the resultant cost is quite significant. It is preferable to avoid the cost in computational overhead and speed caused by transforming the large volume of sample points generated during the tessellation of these surfaces and only transform the control points of the images prior to tessellation.

To maximize the efficiency of rendering the patch while ensuring that the deviation criteria is met, the step size is determined in LC space. Therefore, at step 605, the tessellation threshold and information regarding the patch, specifically, the derivative bounds and control points, are transformed to LC space. The tessellation threshold is translated back from the DC space to the LC space according to the maximum scale of the N transformation. Similarly, the control points of the patch are transformed from the MC space to the LC space using the ME or M' transform and the derivative bounds of the patch are mapped to LC space using the norm of the M' transform.

It has been determined that by ensuring the derivative bounds of the patch to be rendered meets the tessellation threshold transformed to the LC space, the triangles subsequently tessellated meet the tessellation threshold in the DC space. The transformation required, from DC space to LC space "N" is 37 sparse", i.e., the calculations required to perform the transformation are minimal. Thus, the overhead required to bring the deviation threshold to the LC space is minimal. In addition, only the control points of the patch to be rendered and the derivative bounds are transformed from the MC space to the LC space.

Referring back to FIG. 11, at step 610 the uniform step size is determined. Preferably, this is performed by translating information regarding the graphic object, i.e., the trimmed NURBS, to the lighting coordinate LC space via the ME transformation and translating the postviewing transformation thresholds back to the LC space from the DC space using the maximum scale of the N transformation. The uniform step size may then be determined according to the following equations:

$$Step_u = \frac{1}{n_d{}^u}$$

$$Step_v = \frac{1}{n_d{}^v}$$

Where $$n_d{}^u = \frac{\sqrt{D_{uu}D_{vv} + D_{uv}\sqrt{D_{uu}D_{vv}}}}{\sqrt{2}\sqrt{t_d D_{vv}}}$$

$$n_d{}^v = \frac{\sqrt{D_{uu}D_{vv} + D_{uv}\sqrt{D_{uu}D_{vv}}}}{\sqrt{2}\sqrt{t_d D_{uu}}}$$

where $n_d{}^u$ is the number of uniformly spaced steps in the u direction, $n_d{}^v$ is the number of uniformly spaced steps in the v direction, Duu, Dvv and Dvv respectively represent the second order derivative bounds and td represents the deviation threshold. For further information regarding the determination of a uniform step size, see Salim Abbi-Ezzi, Leon Shirman, "The Tessellation of Curved Surfaces Under Highly Varying Transformation", F. H. Post, W. Barth, editors, Proceedings Eurographics 91, Eurographics Association (Elsevier Science Publishers, B. V. North-Holland 1991), an impending U.S. patent application, Ser. No. 07/929,819, Filed Aug. 14, 1992. At step 620, Bezier trimming segments are then tessellated into linear segments in accordance with the step size.

To tessellate a Bezier curve in parameter space, a step size criterion is used which provides that the length of a line segment should not exceed the diagonal of a single rectangular cell defined by the step sizes of the patch.

Therefore, the length of the line segments can be determined:

$$S_{curve} = \frac{k*d}{\sqrt{Su^2 + Sv^2}}$$

where k is a constant that specifies the resolution of the tessellated trimming curve in relation to the surface it lies on, d is the bound of the first derivative of the curve and Su, Sv are the u/v step sizes of the patch.

At this point in the processing, each v-region independently maintains the information necessary to continue processing. Thus, Phase II may be implemented on one or more dedicated processors which can process each v-region independently. The system is preferably configured with a plurality of processors such that Phase II traversal can be performed in parallel to further speed up the amount of time required for processing.

Figure 13:
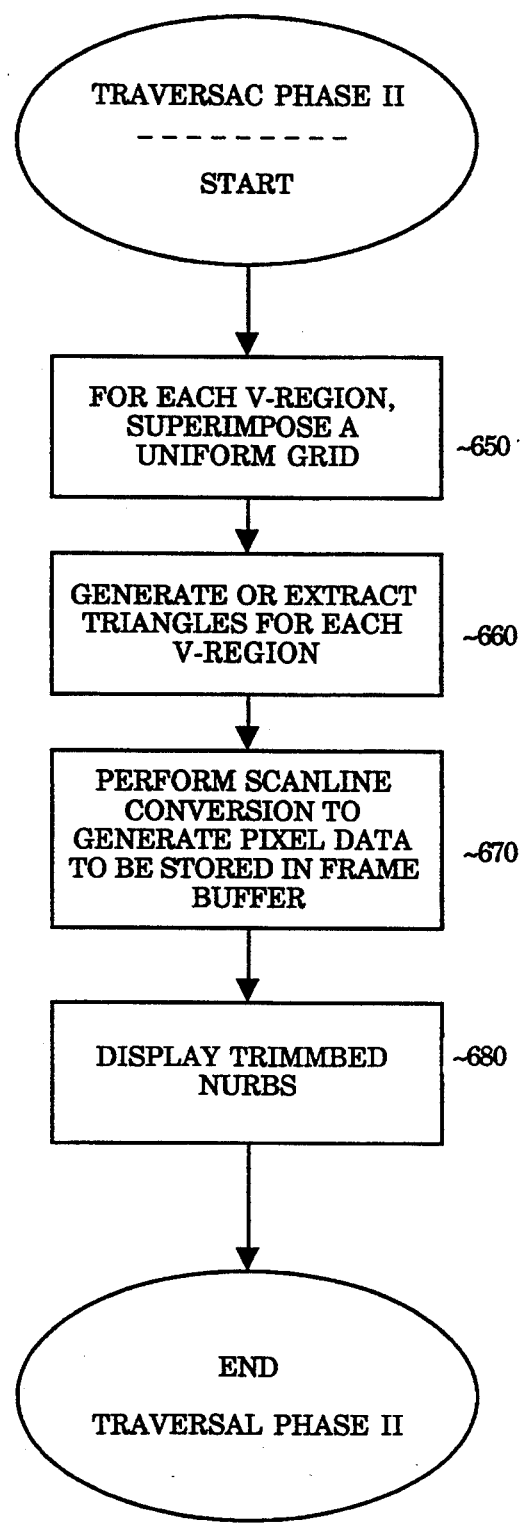
FIG. 13 is a flowchart illustrating the Phase II traversal process.

FIG. 13 sets forth the Phase II traversal process. Referring to FIG. 13, at step 650, for each v-region a uniform grid is superimposed which is adapted in the v direction to fit the v-region. The uniform grid is generated according to the U and V step sizes determined for the patch. The triangles are then generated for each v-region, step 660. Lighting calculations are performed on the triangles, and the triangles are transformed to DC space. Scan line conversion, step 670, is then performed for each triangle to generate the pixel data to be stored in the frame buffer. At step 680, the display controller accesses the frame buffer to generate the control signals to actuate the pixel locations at the intensity and color indicated by the pixel data to generate a visual representation of the trimmed NURBS.

The step of superimposing the uniform grid on each v-region and tessellating the v-region into triangles is preferably performed according to the following process described with reference to FIG. 14. At step 700, initialization is first performed for computing the u and v grid lines by considering the top and bottom of the v-region, the u and v step sizes for the patch and the "sticky" lines that go through the region.

In graphics standards (e.g., PHIGS), one of the attributes for NURBS surfaces is the specification of a certain number of u and v isoparametric lines referred to as "sticky lines," that have to be rendered on top of the triangles. This is useful for enhancing the display of the surface, or to do wire frame rendering when there is no hardware shading. These lines may be uniformly spaced over the entire surface, or may be uniformly spaced within every patch.

In order to accommodate sticky lines, this attribute is checked during Phase I of traversal and information is provided to each patch regarding the sticky lines that pass through it. During Phase II traversal, in order to ensure that these sticky lines do not penetrate the triangles, two adjacent sticky lines (or a sticky line and a patch or v region boundary) are utilized to compile a new step size for the region between the two lines, while generating the grid in parameter space, the new step size is based on the dynamic step size computed for the patch and the distance between lines. Assuming that the distance between the two lines is d, and the step size for the patch is S, the new step size S' is:

$$S' = \frac{d}{\lceil d/S \rceil}$$

For v-regions without "sticky lines", the same formula is used by setting d to the height of the v-region. Since $S' \leq S$, the tessellation criteria is still satisfied. The result is that the sticky lines will always lie along triangle edges.

The surface is then evaluated according to the grid points. Sample points on the surface of the patch are generated at grid points in parameter space by evaluating the equation of the patch. For more efficient evaluation, the equation of the patch (which is in Bezier basis) is converted to a power basis. In order to evaluate a number of grid points on a single row, the univariate equation of the row is determined by using Horner's rule on the bivariate patch equation. Points on the row are then computed by evaluating this equation at specific grid intervals. By using a "symmetric" power basis for the row equation (where the parameter value ranges from $-0.5$ to $+0.5$ instead of from 0 to 1), the grid points on a row can be evaluated in pairs by exploiting the symmetric nature of the equation. For details on this faster evaluation method, refer to "Symmetric Evaluation of Polynomials", *Graphics Gems*, edited by Andrew Glassner, (Academic Press, 1990).

The normalized normal determined is preferably determined by evaluating the two tangents in u and v, computing a cross product and normalizing the result using an inverse square root lookup table. However, if it is known that the surface has a simple geometry (e.g., planar, cylindrical, conical or spherical), it is preferred that other methods particular to the geometry are used to compute the normal more efficiently. For example, for a spherical NURBS surface, the normal is simply the normalized vector joining the center and the point on the surface.

In the preferred embodiment, each point on the trimming chain is evaluated as a stand-alone point. Alternatively, points on trimming curves which do not lie on the uniform grid are evaluated as "stand-alone" points. Preferably, these stand-alone points and their normals are computed at compile-time using a power basis in modeling coordinates (MC) because this process is computationally intensive. For each such point (u, v), the univariate equation of the curve is evaluated at the v value, and this curve is then evaluated at the u value. The normalized normal is computed by evaluating the two tangent surfaces in u and v, computing a cross-product and normalizing. Of course, if the surface has a simple geometry, a more optimal method can be used. Therefore, at traversal, these points are simply transformed from MC to LC. As a further optimization of the process, for the case of dynamically tessellated Bezier trimming curves, the tessellated (and evaluated) linear segments are stored across multiple tessellations, and reused for each subsequent tessellation for as long as the step sizes of the patch do not change.

Figure 14:
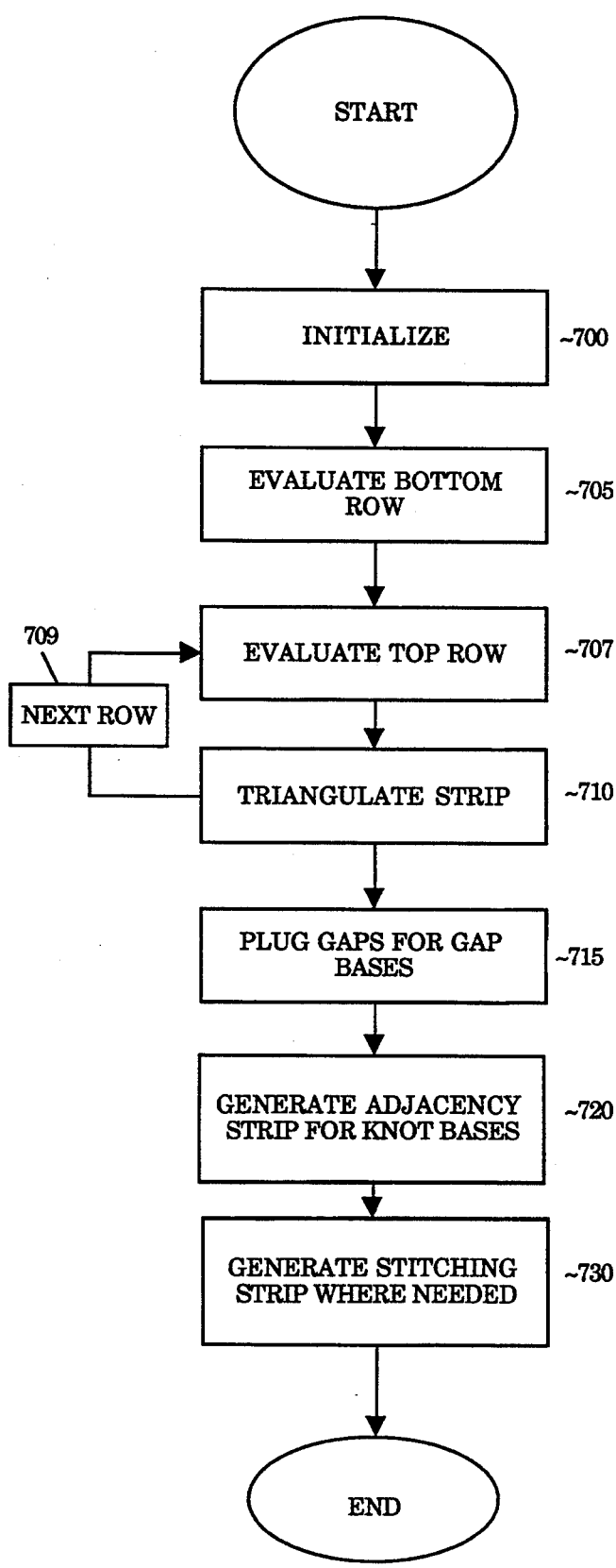
FIG. 14 is a flowchart illustrating the tessellation process utilized.

Continuing with the process of tessellation as set forth in FIG. 14, at step 705, the bottom row of the region is evaluated by computing the points in WC space along the row defined by the grid and the normals at those points on the surface. At step 707, 710, 709, for each pair of rows, the top row is similarly evaluated to determine the points and normals. The strip defined by the top and bottom row of points is then triangulated.

Figure 15A:
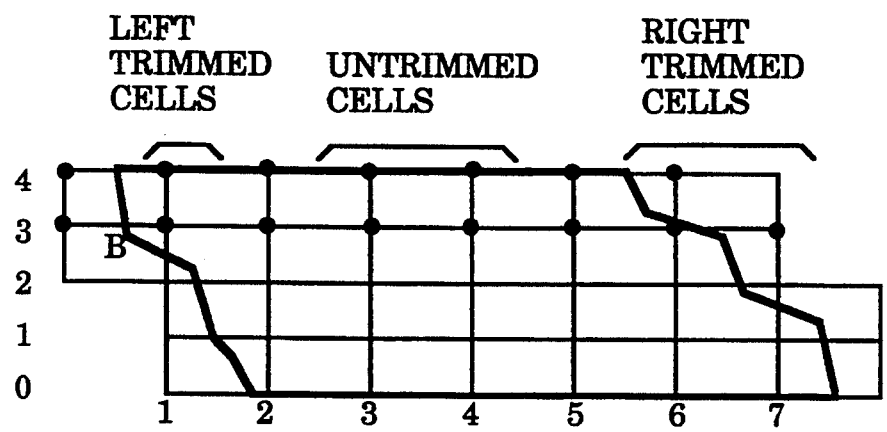
FIGS. 15a and 15b illustrate untrimmed cells, right trimmed cells, left trimmed cells and doubly trimmed cells.
Figure 15B:
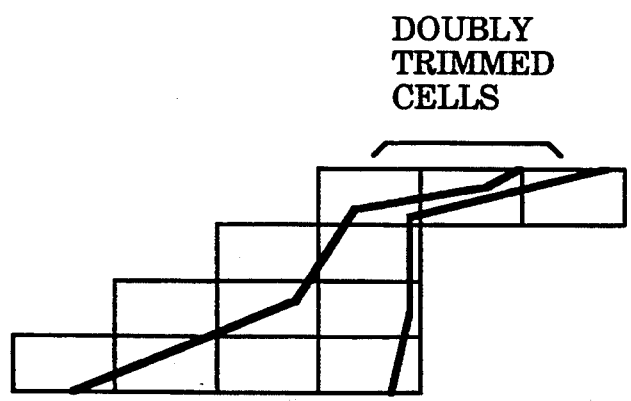

During tessellation, a number of types of cases must be considered. Referring to FIG. 15a and 15b, each strip consists of up to three zones or group of cells. Each strip can consist of a left trimmed zone, an untrimmed or doubly trimmed zone and a right trimmed zone. As will be explained subsequently, these zones are processed independently of each other. Furthermore, if the top or bottom bases have been classified during compilation as type Gap, the gap points are evaluated to generate the gap point in LC and normal of the surface at that point and, using the grid points of the row, the triangles are generated to plug the gaps, step 715. Preferably the gap points are evaluated at compilation in MC space and subsequently transformed to LC space. If the top or bottom bases are of type Knot (i.e., the base spans the complete patch boundary) an adjacency strip is used to triangulate the boundary strip. In this case the boundary row is triangulated using the neighboring patch step size. Stitching strips, step 730, are also generated where required when the bases are not knot lines or if there are sticky lines.

Triangulation is performed by utilizing the two rows of evaluated grid points which form cells and the left and right trim sides for the row of cells. These sides are the points along the v-regions sides. As noted earlier, the strip consists of up to three zones: left trimmed cells which have the left trimmed side crossing through the cell, untrimmed cells which do not have any trimmed sides crossing through the cells, doubly trimmed cells which have both the left and right trimmed sides crossing through the cell, and right trimmed cells which have only the right trimmed side going through the cell. It should be noted that a row may or may not have each of the above zones. For example, a single row cannot have both untrimmed and doubly trimmed cells. A v-region in which both sides are of the type border has only untrimmed cells.

Figure 16A:
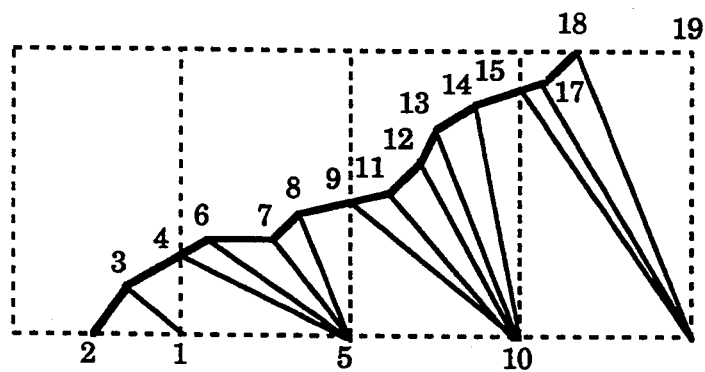
FIGS. 16a, 16b, 16c illustrate various examples of tessellation of triangles.

A sequence of left trimmed cells is triangulated by using the lower right corners if the side is decreasing, and the upper right corner if the side is increasing. For example, see FIG. 16a. FIG. 16a shows the tessellation of a sequence trimmed cells with a decreasing side such that the lower right corners are used. The order in which the points are generated and submitted to the mechanism for tessellation is shown by the numeric sequence.

Figure 16B:
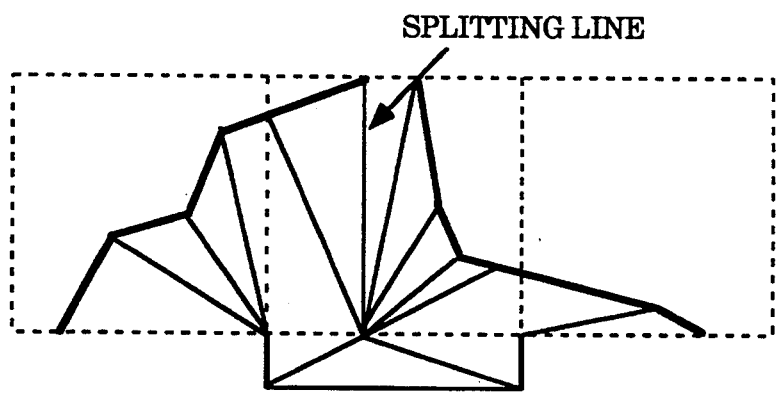
Figure 16C:
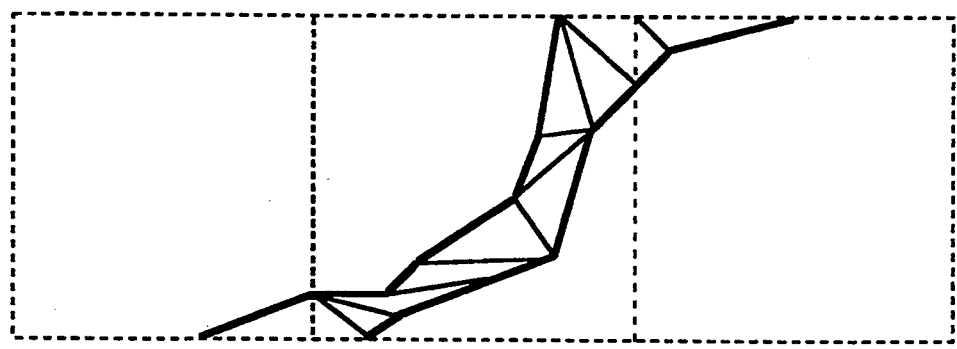

There are two cases for tessellating doubly trimmed cells. As illustrated in FIG. 16b, the first case is if the u extents of the two sides in the cell do not overlap, which occurs if the two sides have opposite orientation. In this case, the cell is vertically split into a left trimmed cell and a right trimmed cell which individually are tessellated. If the u extents of the two sides do overlap, which happens if the two sides have the same orientation, a more general scheme is utilized for triangulation. The resultant effect is visually illustrated in FIG. 16c.

To perform triangulation for the general case, it is preferred that an adaptation of the "O(n) algorithm" by Garey, et al, is utilized for triangulation of a monotone polygon. In this algorithm, the polygon is sorted into two monotone sides and triangles are generated by using a stack to send points one by one and examining the side and angles attended. Preferably, the points are already sorted on either side because the sides are monotone. For further information see, Garey, Johnson, Preparata, Tarjan, "Triangulating a Simple Polygon," *Information Processing Letter*, vol. 7, no. 4, pp. 175–180 (1978).

Figure 17A:
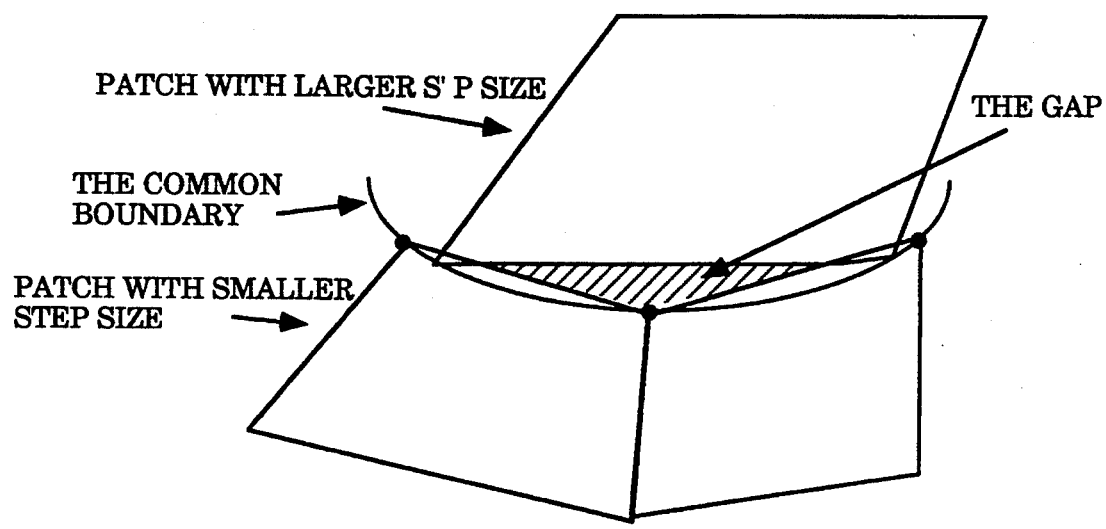
FIGS. 17a and 17b respectively illustrate a gap and an adjacency strip to fill the gap.
Figure 17B:
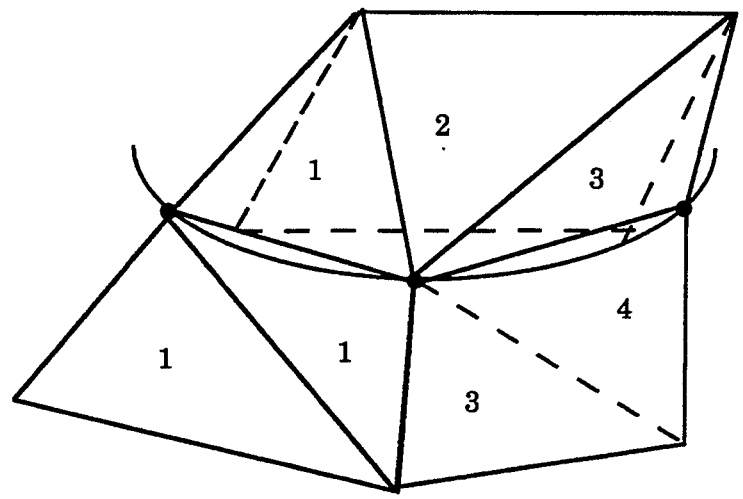

Preferably, the following process is used for triangulation. Two precision linear lines (these lines correspond to the current top and bottom row pair determined) that define the region to be triangulated are labeled the "A" and "B" lines. Three registers A, B, C are utilized in this process. During traversal, the two lines are traversed and calls are made into routines "Init" and "Send (A/B)". Init is a process to start a strip to be triangulated. The Send routine sends points on line A or line B to the registers. The edge_flag and other_edge_flag indicate whether a line is to be drawn between the new point and the point it is replacing or the point it is not replacing. Exemplary pseudo code for triangulation is:

1. Init (a_b_new_cw_flag): count←0
2. Send (Reg A/B, Pnt, edge_flag, other_edge_flag):
   Count++;
   Reg C←Pnt;
   If Count≧3, (Reg A, Reg B, Reg C);
   Reg A/B←Reg C;

When rendering NURBS surfaces, there is a possibility that gaps in the surface may occur. Adjacent patches may result in different step sizes which lead to gaps on common edges. This is illustrated in FIG. 17a. A simple solution is illustrated in FIG. 17b. FIG. 17b illustrates an adjacency strip which is created to fill in the gap shown in FIG. 17a.

In the present invention, information regarding gaps is generated during compilation and Phase I of the traversal process such that gaps can be avoided when the patches are independently traversed in Phase II. The information regarding the gaps along the boundary between two given patches is provided along with one of the patches. Although a common boundary exists between the two patches, it is only necessary that one of the two patches deal with the gap situation. Preferably the patch with the larger step size along the common boundary is the one that will generate the gap avoidance information.

Figure 18A:
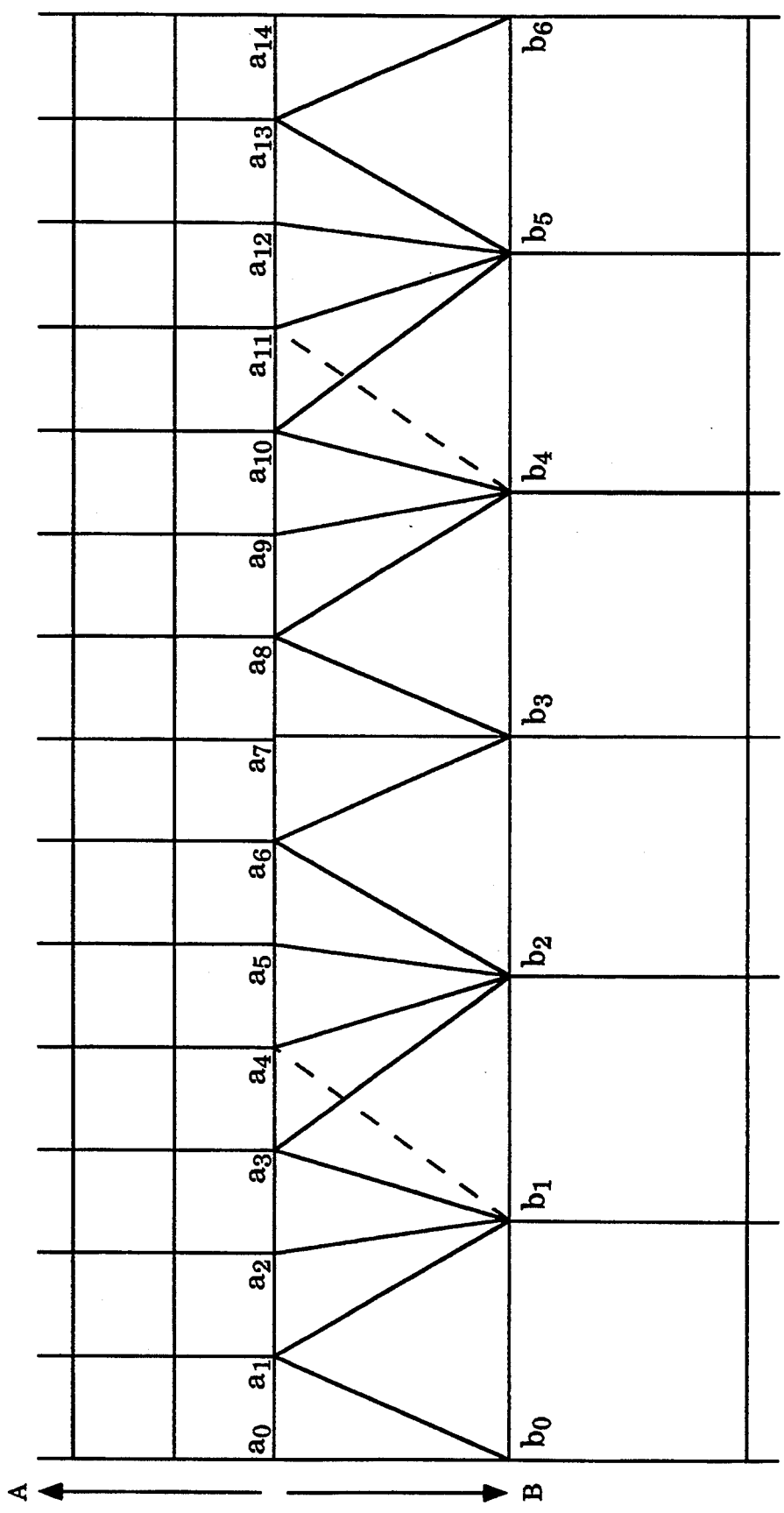

There are two types of gap avoidance information that are utilized dependent upon the gap generation technique performed. The first technique is the adjacency strip. If two given patches are both untrimmed, but have different step sizes, then the patch of the larger step size generates an adjacency strip to avoid gaps with its neighbor. In the case of trimmed patches, an adjacency strip can still be used if the top or bottom base is a knot segment. During Phase I of the traversal process, information regarding the neighbor's step size and boundary type (e.g., top, bottom, right, left) is maintained with each patch such that the patch can be processed independently of the neighbor. During the Phase II of the traversal process, triangulation takes place and any adjacency strips that are needed are generated. An exemplary algorithm for the generation of adjacency strips is provided in FIG. 18a. Using the adjacency technique described herein, referring to FIG. 18b, the strip is generated by triangulating the patch with the larger step size, B, with points from patch A.

A stitching strip is a more general mechanism to plug gaps between two patches of different step sizes. Preferably it is used when the adjacency strip cannot be used since it is less efficient. A stitching strip has a zero width in parameter space and hence consists of near degenerate triangles in modeling space (see FIG. 19a). The description of a stitching strip is generated during Phase I of traversal and is utilized during Phase II. The stitching strip description is based on the intercept vertices of the boundary, the v-region intercepts on both sides of the boundary, and the step sizes of the patches along the boundary. Based on this information, two sequences of scalars for each adjacency boundary, one for the first patch (A) and one for the second patch (B), are generated. A sequence of scalars for the patch include the parametric values where patch boundary sample points occur, in increasing order. The two sequences of scalars are then merged into one sequence where duplicates are removed. Each scalar is labeled to identify the origin of the scalars. For example, a label can be "A", "B" or "C" to indicate if 0 the scalar came from a sequence of patch A, a sequence of patch B or from both. The sequence of scalars and labels is referred to as stitching points and is referred to for the generation of the stitching strip during Phase II of the traversal process.

Figure 19A:
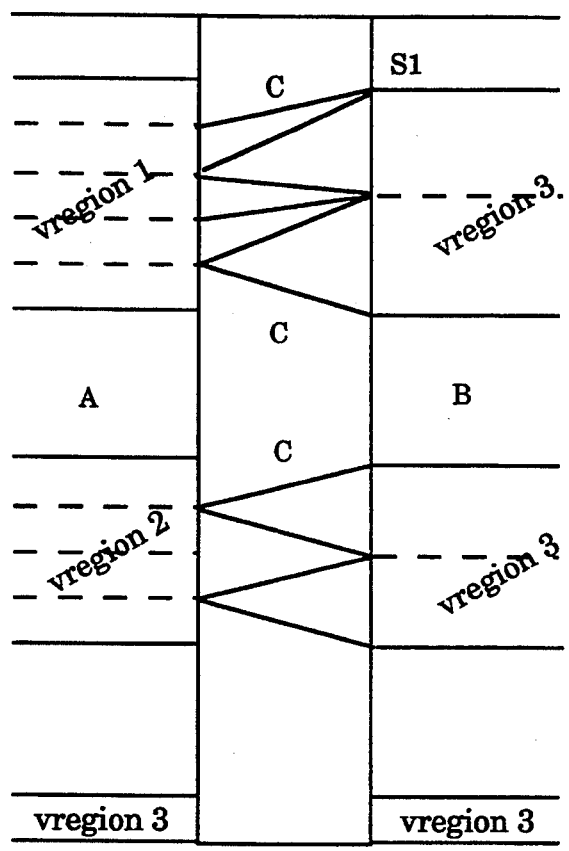
Figure 19B:
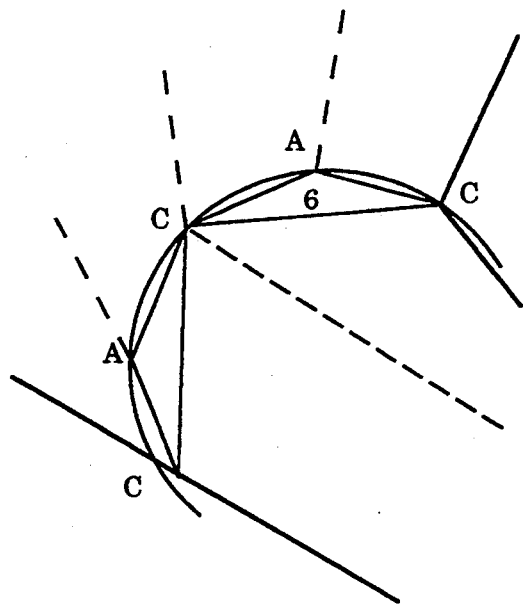

FIG. 19b illustrates the stitching strip of FIG. 19a in object space. FIG. 19c provides an exemplary algorithm to generate a stitching strip from the stitching points. It should be noted that the main difference between a stitching strip and an adjacency strip is that the former involves adding new triangles to plug the gaps, such as illustrated in FIG. 19a and 19b, while the latter involves choosing the triangles of an adjacency strip to avoid the gaps. The adjacency strip approach is more efficient since it does not require the generation of extra triangles; however, the adjacency strip only works in simple cases where there is no trimming or "sticky" lines. Thus, it is preferred to use the adjacency strip for simple cases and the stitching strip for complicated cases.

Once the triangles are tessellated, the points determined and normals of each v-region are passed to a graphics engine or subsystem. Lighting calculations are performed in LC space on each triangle, preferably using the Gouraud shading process which computes a color per vertex based on the normal, surface property, light sources, and the eye-point, and interpolates the color across the triangle. Phong shading may alternatively be used to perform lighting calculations. The Phong shading process interpolates normals and computes the color for each pixel.

The triangles are transformed from LC space to DC space after the triangles are modified to include lighting characteristics. The N transformation which transforms objects from LC space to DC space is a sparse transformation and is quite inexpensive to implement. Although a greater number of transformations is required to transform all tessellated triangles representative of a curved surface rather than generating the triangles in DC, the sparseness of the transform as well as the resultant effect of generating accurately shaded curved surfaces more than justifies the costs.

The triangles are scan converted to generate the pixel data used to control the display apparatus. The pixel data generated in DC space will define various attributes of the object to be display, including the shape location, color and intensity of the object on the display of the object. The pixel data generated is stored in a frame buffer at a location which corresponds with a predetermined position on the display device. For further information regarding scan conversion, see Foley, van Dam, Feiner, Hughes, *Computer Graphics, Principles and Practice,* 2d edition, pp. 945–965 (1990 Addison-Wesley Publishing). Preferably Z buffering is performed at this time to provide for dimensional depth cueings of graphic objects.

The curved surface is generated on the display device according to the pixel data generated. The pixel data stored in the frame buffer is decoded to control the display controller and display device to actuate pixels at the location, color and intensity specified by the pixel data to generate a visible curved surface on the display device.

The above process further provides for a system in which the complex operations are performed during compilation in the host processor which has the resources for performing these complex processes. The simple but repetitive operations can then be performed in dedicated processing devices which are fast in implementation and inexpensive to provide. Furthermore, the above process provides for a system which can take advantage of parallel processing to further speed up and increase the efficiency of the system as each v-region is constructed during compilation to contain most of the information required during traversal, and Phase II traversal can be performed independently and in parallel with respect to each v-region.

Figure 20:
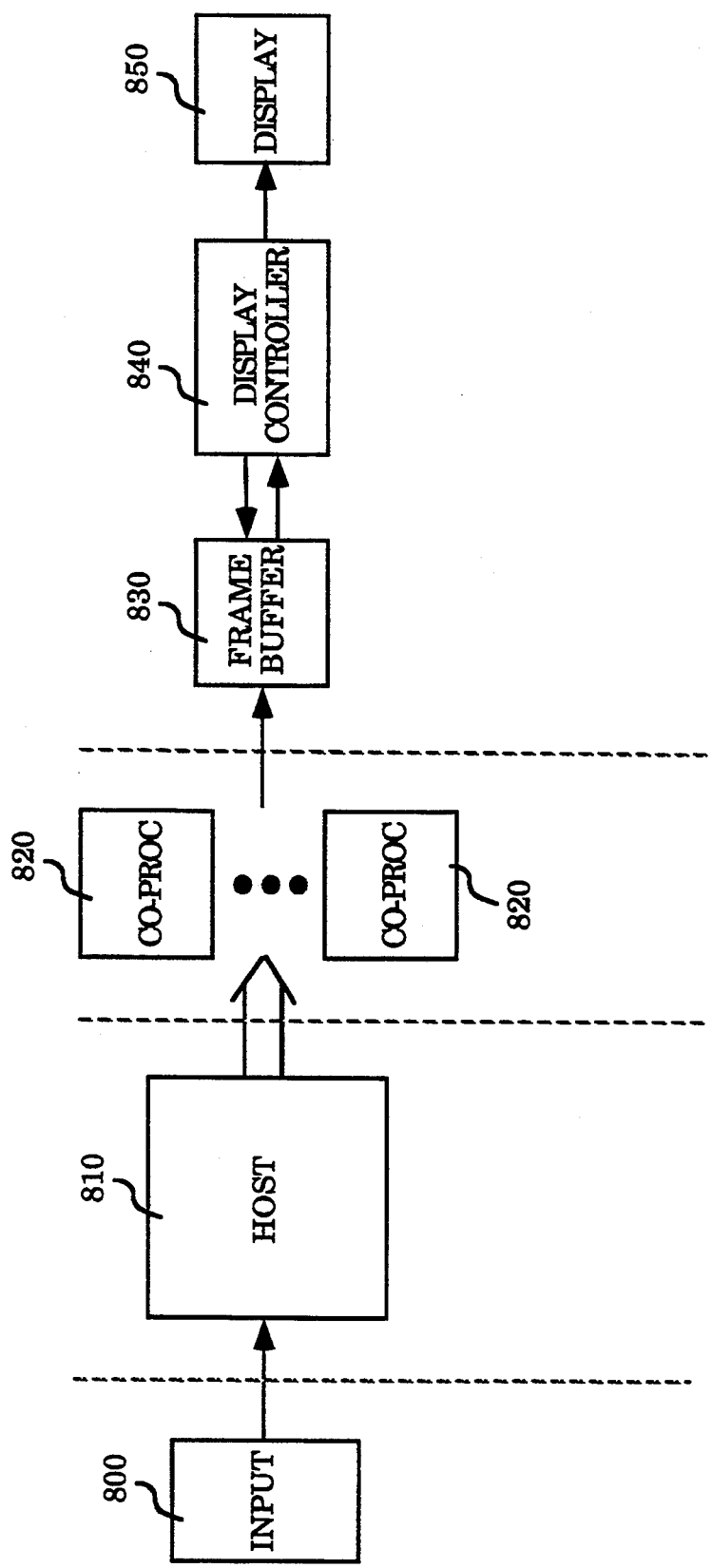
FIG. 20 illustrates the distribution of processes among the processing components in the system.

The system of the present invention may be best described with reference to FIG. 20. Input 800 is provided to the host computer 810. The host is utilized to perform the complex processes and computations which require significant resources. The co-processor 820 is a dedicated processor or processors which performs straightforward but highly repetitive process steps. For example, a floating point processing unit (FPU) can be used in conjunction with a VLSI chip configured to perform specified functions such as the scan conversion of triangles into pixels. The process of the present invention lends itself to subdivision of process steps to maximize efficiency of the rendering pipeline. In particular, the host performs the compilation process.

In one embodiment, the uniform step size and the control points of the curved surface are sent to co-processor 820 to perform the highly repetitive computations such as tessellation of the triangles representing the curve surface, lighting determinations and scan conversion of the triangles to pixel data to be stored in the frame buffer 830. In this embodiment, the co-processor consists of a floating point processing unit (FPU), memory and a VLSI design to render triangles to generate pixel data. The FPU, utilizing the memory, tessellates the curved surface into triangles, performs lighting determinations and transforms the triangles from LC space to DC space. The VLSI converts each triangle into pixel data and stores the pixel data in the frame buffer. Alternately, the host 810 tessellates the curved surface into triangles and the co-processor simply performs the scan conversions to generate pixel data for each triangle. Preferably, the co-processor 820 is implemented in dedicated hardware to maximize the speed of processing. An example of a graphics co-processor 820 is SPARCstation 2/GT graphics accelerator manufactured by Sun Microsystems, Inc.

The display controller, a second dedicated processor, 840 reads the pixel data from the frame buffer and actuates the corresponding pixels on the display device 850. As noted earlier, the pixel data is stored at predetermined locations in the frame buffer such that there is a predetermined relationship between the location of pixel data in the frame buffer and the actuation of pixels according to that pixel data on the display device. Preferably, the data is stored according to the XY coordinate location of the pixel in the DC space. The display controller 840 sequentially reads the pixel data from the frame buffer 830 and issues control signals to the display device to control the electron beams and therefore, the color, intensity and location of each pixel.

While the invention has been described in conjunction with the preferred embodiment, it is evident that numerous alternatives, modifications, variations and uses will be apparent to those skilled in the art in light of the foregoing description.

What is claimed is:

1. In a computer system comprising a central processing unit (CPU), memory and input/output devices including a graphic display controller coupled to a graphic display device, a method for tessellating graphic images comprising trimmed non-uniform rationale b-spline (NURBS) surfaces for rendering on the graphic display device, each trimmed NURBS having a first set of control points defining the surface and a second set of control points defining at least one trimming loop through the surface, said control points being defined in a Model Coordinate (MC) space, said graphic display device defined according to device coordinate (DC) space, said method comprising the steps of:

compiling the trimmed NURBS surface into at least one patch comprising at least one v-region, each v-region formed by boundaries including a top base, bottom base, left side and right side, said top and bottom base defined by isoparametric lines along a u axis and said right and left sides defined by u, v monotone lines;

traversing each v-region, comprising the steps of;
      tessellating each v-region into a plurality of triangles,
      generating pixel data representative of each triangle, each pixel data specifying an intensity of the pixel to be displayed on the graphic display device, and
      storing each pixel data in a frame buffer, each pixel data being stored at a location in the frame buffer corresponding to the location of the pixel in the DC space; and said graphic display controller reading the pixel data stored in the frame buffer and generating control signals to actuate the pixels on the graphic display device at the location and intensity indicated by the pixel data;

wherein trimmed NURBS surfaces are generated and displayed on the graphics display device.

2. The method for tessellating graphic images comprising trimmed NURBS surfaces as set forth in claim 1, wherein said step of compiling comprising the steps of:
   reducing the trimmed NURBS into at least one Bezier patch;
   dividing each trimming loop into a monotone trimming chain per Bezier patch; and
   dividing each patch into at least one u–v monotone "v-region", each v-region formed by boundaries including a top base, bottom base, left side and right side, said top and bottom base defined by isoparametric lines along a u axis and said right and left sides defined by u, v monotone lines delineated by a trimming chain or a border of the patch.

3. The method for tessellating graphic images comprising trimmed NURBS surfaces as set forth in claim 2, further comprising the step of traversing each patch by determining a uniform step size for each patch, said step size used to tessellate each patch into a plurality of triangles.

4. The method for tessellating graphic images comprising trimmed NURBS surfaces as set forth in claim 3, wherein said step of traversing each v-region further comprises the step of superimposing a uniform grid of cells determined from the boundaries of the v-region and the uniform step size in u and v, wherein said step of tessellating each v-region comprises tessellating each row of cells into a plurality of triangles.

5. The method for tessellating graphic images comprising trimmed NURBS surfaces as set forth in claim 4, wherein each trimming chain comprises at least one segment, each segment identified by a coordinate in u,v and an indication whether the segment is increasing or decreasing in the u or v directions.

6. The method for tessellating graphic images comprising trimmed NURBS surfaces as set forth in claim 5, wherein each segment is a Bezier curve.

7. The method for tessellating graphic images comprising trimmed NURBS surfaces as set forth in claim 5, wherein each segment is a linear segment.

8. The method for tessellating graphic images comprising trimmed NURBS surfaces as set forth in claim 5, wherein said step of compiling further comprises the step of identifying extreme vertices and intercept vertices at patch border crossings of the trimming chains.

9. The method for tessellating graphic images comprising trimmed NURBS surfaces as set forth in claim 8, wherein an extreme vertex is identified if a segment has an opposite u or v direction from a previous adjacent segment of the trimming chain or has a u/v extreme within itself if it is a Bezier curve, and a border vertex is identified at the location a segment crosses a patch boundary.

10. The method for tessellating graphic images comprising trimmed NURBS surfaces as set forth in claim 9, further comprising the step of classifying each vertex as being a type of vertex.

11. The method for tessellating graphic images comprising trimmed NURBS surfaces as set forth in claim 10, wherein the step of dividing each patch into at least one u–v monotone v-region comprises the step of:
    identifying at least one pair of intercept vertices on the left and right sides;
    identifying a beginning of an active v-region according to the identified intercept vertices on a top border;
    processing the remaining intercept vertices and extreme vertices in descending order according to a v coordinate value of the vertices, said step comprising inspecting the type of each vertex and forming the bottom and closure of active v-regions and opening new v-regions according to the type of vertex.

12. The method for tessellating graphic images comprising trimmed NURBS surfaces as set forth in claim 2, wherein the step of traversing each patch comprises the steps of:
    determining derivative bounds of a curved surface to be tessellated and rendered;
    transforming the derivative bounds to a Lighting Coordinate (LC) Space in accordance with a norm of a transform from modeling coordinate (MC) space to LC space;
    transforming the control points to LC space in accordance with the transform from MC space to LC space;

translating the tessellation criteria to LC space in accordance with a maximum scale of a viewing transformation from DC space to LC space; and determining the uniform step size in LC space using the derivative bounds, the control points and tessellation criteria.

13. The method for tessellating graphic images comprising trimmed NURBS surfaces as set forth in claim 1, wherein said step of compiling further comprising the step of providing gap avoidance information with each patch;

said method further comprising the step of generating triangles to fill in gaps between patches.

14. The method for tessellating graphic images comprising trimmed NURBS surfaces as set forth in claim 13, wherein the step of generating triangles to fill in gaps between patches comprises the generation of an adjacency strip associated with a patch having a larger step size which adjusts the size of the triangles in the adjacency strip to remove gaps.

15. The method for tessellating graphic images comprising trimmed NURBS surfaces as set forth in claim 13, wherein the step of generating triangles to fill in gaps between patches comprises generating a stitching strip by adding triangles between the patches.

16. In a computer system comprising a central processing unit (CPU), memory and input/output devices including a graphic display controller coupled to a graphic display device, an apparatus for tessellating graphic images comprising trimmed non-uniform rationale b-spline (NURBS) surfaces for rendering on the graphic display device, each trimmed NURBS having a first set of control points defining the surface and a second set of control points defining at least one trimming loop through the surface, said control points being defined in a Model Coordinate (MC) space, said graphic display device defined according to Device Coordinate (DC) space, said apparatus comprising:

a compiler for compiling the trimmed NURBS into at least one patch comprising at least one u–v monotone v-region, each v-region formed by boundaries including a top base, bottom base, left side and right side, said top and bottom base defined by isoparametric lines along a u axis and said right and left sides defined by u, v monotone lines;

means for traversing each v-region, comprising;

means for tessellating each v-region into a plurality of triangles, and means for generating pixel data representative of each triangle, each pixel data specifying an intensity of the pixel to be displayed on the graphic display device; and a frame buffer memory coupled to the means for generating pixel data for storing each pixel data at a location corresponding to the location of the pixel in the device coordinate space;

said graphic display controller reading the pixel data stored in the frame buffer and generating control signals to actuate the pixels at the location and intensity indicated by the pixel data;

wherein trimmed NURBS surfaces are generated and displayed on the graphics display device.

17. The apparatus for tessellating graphic images comprising trimmed NURBS surfaces as set forth in claim 16, wherein said compiler comprises:

means for reducing the NURBS into at least one Bezier patch, means for dividing each trimming loop into a monotone trimming chain per Bezier patch; and means for dividing each patch into at least one u–v monotone v-region, each v-region formed by boundaries including a top base, bottom base, left side and right side, said top and bottom base defined by isoparametric lines along a u axis and said right and left sides defined by u, v monotone lines delineated by a trimming chain or a border of the patch.

18. The apparatus for tessellating graphic images comprising trimmed NURBS surfaces as set forth in claim 17 further comprising means for traversing each patch, comprising means for determining a uniform step size for each patch, said step size used to tessellate each patch into a plurality of triangles.

19. The apparatus for tessellating graphic images comprising trimmed NURBS surfaces as set forth in claim 18, wherein said means for traversing each v-region further comprises a uniform grid of cells determined from the boundaries of the v-region and the uniform step size in u and v, wherein said means for tessellating comprises means for tessellating each row of cells into a plurality of triangles.

20. The apparatus for tessellating graphic images comprising trimmed NURBS surfaces as set forth in claim 19, wherein each trimming chain comprises at least one segment, each segment identified by a coordinate in u,v and an indication whether the segment is increasing or decreasing in the u or v directions.

21. The apparatus for tessellating graphic images comprising trimmed NURBS surfaces as set forth in claim 20, wherein said means for compiling further comprises means for identifying extreme vertices and the intercept vertices at patch border crossings of the trimming chains.

22. The apparatus for tessellating graphic images comprising trimmed NURBS surfaces as set forth in claim 21, wherein an extreme vertex is identified if a segment has an opposite u or v direction from a previous adjacent segment of the trimming chain and a border vertex is identified at the location a segment crosses a patch boundary.

23. The apparatus for tessellating graphic images comprising trimmed NURBS surfaces as set forth in claim 22, further comprising a means for classifying each vertex according to a type.

24. The apparatus for tessellating graphic images comprising trimmed NURBS surfaces as set forth in claim 23, wherein the means for dividing each patch into at least one u–v monotone v-region comprises:

means for identifying at least one pair of intercept vertices on the left and right sides;

means for identifying a beginning of an active v-region according to the identified intercept vertices on a top border;

means for processing remaining intercept vertices and extreme vertices in descending order according to a v coordinate value of the vertices, said means for processing determining the type of each vertex and forming the bottom and closure of active v-regions and opening new v-regions according to the type of vertex.

25. A computer system for tessellating graphic images comprising trimmed non-uniform rationale b-spline (NURBS) surfaces for rendering a graphic image on a graphic display device, each trimmed NURBS having a first set of control points defining the surface and a second set of control points defining at least one trimming loop through the surface, said control points being defined in a Model Coordinate (MC) space, said graphic display device defined according to Device Coordinate (DC) space, said apparatus comprising:

a host processor, said host processor, compiling the trimmed NURBS surface into at least one patch comprising at least one v-region by reducing the NURBS into at least one Bezier patch, dividing each trimming loop into a monotone trimming chain according to the patch the portion of the trimming loop delimits, and dividing each patch into at least one u–v monotone v-region, each v-region formed by boundaries including a top base, bottom base, left side and right side, said top and bottom base defined by isoparametric lines along the u axis and said right and left sides defined by u, v monotone lines delineated by a trimming chain or a border of the patch, and traversing each patch, by determining a uniform step size for each patch, said step size used to tessellate each patch into a plurality of triangles;

a graphics processing subsystem coupled to the host processor, said graphics processing subsystem superimposing a uniform grid of cells determined from the boundaries of the v-region and the uniform step size in u and v, tessellating each row of cells into a plurality of triangles, generating pixel data representative of each triangle, each pixel data specifying an intensity of the pixel to be displayed on the graphic display device; and a frame buffer coupled to the graphics processing subsystem, for storing each pixel data in a frame buffer, each pixel data being stored at a location in the frame buffer corresponding to the location of the pixel in the device coordinate space; and a graphic display controller coupled to the frame buffer and the graphic display device for reading the pixel data stored in the frame buffer and generating control signals to actuate the pixels on the graphic display device at the location and intensity indicated by the pixel data;

wherein trimmed NURBS surfaces are generated and displayed on the graphics display device.

26. The apparatus as set forth in claim 25, wherein said graphics processing subsystem comprises:

at least one floating point processing unit for generating triangles in accordance with the uniform step size, lighting the triangles in accordance with light sources defined for the graphic image to be rendered and transforming a polygon to DC space from LC space; and at least one dedicated graphics processor coupled to the floating point processor for receiving transformed polygons and for generating pixel data for each polygon received.

* * * * *